(12) United States Patent
Alonso et al.

(10) Patent No.: US 12,363,233 B2
(45) Date of Patent: Jul. 15, 2025

(54) APPLICATION AWARENESS OF CREDIT CONDITIONS IN COMMUNICATION NETWORK

(71) Applicant: Telefonaktiebolaget LM Ericsson (publ), Stockholm (SE)

(72) Inventors: Susana Fernandez Alonso, Madrid (ES); Fuencisla Garcia Azorero, Madrid (ES); Maria Belen Pancorbo Marcos, Madrid (ES); Juying Gan, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 487 days.

(21) Appl. No.: 17/908,358

(22) PCT Filed: Mar. 4, 2021

(86) PCT No.: PCT/EP2021/055422
§ 371 (c)(1),
(2) Date: Aug. 31, 2022

(87) PCT Pub. No.: WO2021/204470
PCT Pub. Date: Oct. 14, 2021

(65) Prior Publication Data
US 2023/0099649 A1    Mar. 30, 2023

(30) Foreign Application Priority Data
Apr. 7, 2020 (EP) .................................... 20382278

(51) Int. Cl.
*H04M 15/00* (2024.01)
*H04M 15/02* (2006.01)

(52) U.S. Cl.
CPC ......... *H04M 15/66* (2013.01); *H04M 15/852* (2013.01); *H04M 15/888* (2013.01)

(58) Field of Classification Search
CPC .. H04M 15/66; H04M 15/852; H04M 15/888; H04M 15/83; H04M 15/851;
(Continued)

(56) References Cited

U.S. PATENT DOCUMENTS

2012/0099715 A1* 4/2012 Ravishankar ......... H04M 15/88
379/114.01
2013/0324078 A1* 12/2013 Xue ..................... H04M 15/88
455/406

(Continued)

FOREIGN PATENT DOCUMENTS

| CN | 103582171 B | 2/2017 |
| EP | 2343853 A1 | 7/2011 |
| WO | WO-2014207518 A1 * | 12/2014 ......... H04L 12/1407 |

OTHER PUBLICATIONS

"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.

(Continued)

*Primary Examiner* — Marisol Figueroa
(74) *Attorney, Agent, or Firm* — Murphy, Bilak & Homiller, PLLC

(57) ABSTRACT

A method performed by an application function, AF, for a communication network, wherein the AF has been informed, in a first notification, about an out-of-credit event associated with a user of a service provided by the AF, the method comprising sending subscription request, to a network function, NF, for requesting notifications about reallocation-of-credit events associated with one or more users of a service provided by the AF; receiving, from the NF, a second notification of a reallocation-of-credit event associated with the user of the service provided by the AF for which the AF has been informed about the out-of-credit event, such that (Continued)

the AF can perform one or more second actions with respect to the service.

20 Claims, 10 Drawing Sheets

(58) Field of Classification Search
CPC .. H04M 15/853; H04M 15/854; H04M 15/88; H04M 15/883; H04M 17/02; H04M 17/20; H04W 4/24; H04L 12/1407
See application file for complete search history.

(56) References Cited

U.S. PATENT DOCUMENTS

| | | |
|---|---|---|
| 2014/0051384 A1 | 2/2014 | Mao et al. |
| 2015/0207940 A1 | 7/2015 | Li et al. |

OTHER PUBLICATIONS

"3GPP TS 23.503 V16.4.0", 3rd Generation Partnership Project; Technical Specification Group Services and System Aspects; Policy and charging control framework for the 5G System (5GS); Stage 2 (Release 16), Mar. 2020, pp. 1-115.
"3GPP TS 23.503 V16.4.1", 3rd Generation Partnership Project; Technical Specification Group Services and System Aspects; Policy and charging control framework for the 5G System (5GS); Stage 2 (Release 16), Apr. 2020, pp. 1-115.
"3GPP TS 24.301 V16.3.0", 3rd Generation Partnership Project; Technical Specification Group Core Network and Terminals; Non-Access-Stratum (NAS) protocol for Evolved Packet System (EPS); Stage 3 (Release), Dec. 2019, pp. 1-570.
"3GPP TS 29.214 V16.2.0", 3rd Generation Partnership Project; Technical Specification Group Core Network and Terminals; Policy and Charging Control over Rx reference point (Release 16), Mar. 2020, pp. 1-92.
"3GPP TS 29.508 V16.3.0", 3rd Generation Partnership Project; Technical Specification Group Core Network and Terminals; 5G System; Session Management Event Exposure Service; Stage 3 (Release 16), Mar. 2020, pp. 1-44.
"3GPP TS 29.514 V16.4.0", 3rd Generation Partnership Project; Technical Specification Group Core Network and Terminals; 5G System; Policy Authorization Service; Stage 3 (Release 16), Mar. 2020, pp. 1-157.
"3GPP TS 23.203 V16.2.0", 3rd Generation Partnership Project; Technical Specification Group Services and System Aspects; Policy and charging control architecture (Release 16), Dec. 2019, pp. 1-267.
"Reallocation of credit reporting to the AF", SA WG2 Meeting #S2-138E, S2-200xxxx, E-meeting, (revision of S2-200xxxx), Apr. 20-24, 2020, pp. 1-4.
"Subscription to out of credit notification, service procedures", 3GPP TSG-CT WG3 Meeting #97Bis, C3-184241, Sophia Antipolis, France, Jul. 9-13, 2018, pp. 1-2.
"Subscription to out of credit notification, service procedures", 3GPP TSG-CT WG3 Meeting #97Bis, C3-184434, Sophia Antipolis, France, Jul. 9-13, 2018, pp. 1-3.
"3GPP TS 23.502 V16.4.0", 3rd Generation Partnership Project; Technical Specification Group Services and System Aspects; Procedures for the 5G System (5GS); Stage 2 (Release 16), Mar. 2020, pp. 1-582.
"3GPP TS 29.514 V16.3.0", 3rd Generation Partnership Project; Technical Specification Group Core Network and Terminals; 5G System; Policy Authorization Service; Stage 3 (Release 16), Dec. 2019, pp. 1-143.
"3GPP TS 23.401 V16.4.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Sep. 2019, pp. 1-424.
"3GPP TS 23.501 V16.1.0", 3rd Generation Partnership Project; Technical Specification Group Services and System Aspects; System Architecture for the 5G System; Stage 2 (Release 16), Jun. 2019, pp. 1-368.

\* cited by examiner

APPLICATION AWARENESS OF CREDIT CONDITIONS IN COMMUNICATION NETWORK

FIELD OF THE INVENTION

The present application relates generally to the field of communication networks and more specifically to techniques for managing charging for (e.g., credits available to) a user with respect to one or more applications in a communication network.

BACKGROUND OF THE INVENTION

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to 5G but similar principles can be applied to earlier-generation Long Term Evolution (LTE) networks.

LTE is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

3GPP LTE Rel-10 supports bandwidths larger than 20 MHz but with backward compatibility with LTE Rel-8. As such, a wideband LTE Rel-10 carrier (e.g., wider than 20 MHz) appears as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGVV), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

HSS 131 can communicate with MMEs 134 and 138 via respective S6a interfaces, and with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

In addition, S-GWs 134 and 138 can communicate with a packet gateway (P-GW) 139 via respective S5 interfaces. P-GW 135 provides access to external Packet Data Networks (PDNs), such as PDN 140 shown in FIG. 1. For example, PDN 140 can be the point of entry to (or exit from) EPC 130 of traffic for UE 120. However, if UE 120 has multiple data sessions to multiple PDNs, UE 120 can be connected with multiple P-GWs but it will still be served by only one SGW (e.g., 134 or 138). In some cases, P-GW 135 can also act as an Internet Protocol (IP) router with support for mobile-specific tunneling and signaling protocols. In some deployments, PDN 140 can include an IP Multimedia Subsystem (IMS).

P-GW 135 also communicates with a Policy and Charging Rules Function (PCRF) 138 over an S7 interface. PCRF 138 provides policy control decisions and charging control functionalities for users (e.g., UE 120) operating in the LTE network. PCRF 138 also provides network control of service data flow detection, gating, quality of service (QoS), and flow-based charging (except credit management). PCRF 138 performs these functions (referred to collectively as "policy and charging control" or PCC) together with a Policy Control Enforcement Function (PCEF), which can be part of P-GW 135. For example, PCRF 138 can communicate with the PCEF over the Gx interface as shown in FIG. 1. More generally, these functions are part of a PCC architecture that is defined in 3GPP TS 23.203 (for EPC/LTE).

For example, as a packet data (e.g., IMS) session is being set up, signaling (e.g., SIP signaling) containing media requirements is exchanged between UE 120 and PDN 140. At some time in the session establishment process, PCRF 138 receives those requirements from the PDN (e.g., an IMS P-CSCF) and makes decisions based on network operator rules. Such decisions can include Allowing or rejecting the media request, using new or existing packet data context for the media request, and checking the allocation of new resources against the maximum authorized for UE 120. PCRF 138 communicates with PDN 140 over an RXi interface. Users can be charged for services (e.g., packet data sessions) provided by the LTE network by either an online charging system (OCS) or an offline charging system (OFCS), shown collectively in FIG. 1 as OCS/OFCS 150. A primary difference is that online charging can affect provisioning of services to users in real-time, while offline charging is applied after services are rendered and, thus, does not affect real-time provisioning. Both OCS and OFCS can utilize account control whereby a user's credit balance is checked and maintained in relation to (e.g., deducted for) services provided. As shown in FIG. 1, PCRF 138 communicates with OCS/OFCS 150 via respective Gy/Gz interfaces.

FIG. 2 shows a high-level view of an exemplary 5G network architecture, including a Next Generation Radio Access Network (NG-RAN) 299 and a 5G Core (5GC) 298. As shown in the figure, NG-RAN 299 can include gNBs 210 (e.g., 210*a,b*) and ng-eNBs 220 (e.g., 220*a,b*) that are interconnected with each other via respective Xn interfaces. The gNBs and ng-eNBs are also connected via the NG interfaces to 5GC 298, more specifically to the AMF (Access and Mobility Management Function) 230 (e.g., AMFs 230*a,b*) via respective NG-C interfaces and to the UPF (User Plane Function) 240 (e.g., UPFs 240*a,b*) via respective NG-U interfaces. Moreover, the AMFs 230*a,b* can communicate with one or more policy control functions (PCFs, e.g., PCFs 250*a,b*) and network exposure functions (NEFs, e.g., NEFs 260*a,b*). The AMFs, UPFs, PCFs, and NEFs are described further below.

Each of the gNBs 210 can support the NR radio interface including frequency division duplexing (FDD), time division duplexing (TDD), or a combination thereof. In contrast, each of ng-eNBs 220 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 211*a-b* and 221*a-b* shown as exemplary in FIG. 2.

As mentioned above, the gNBs and ng-eNBs can also use various directional beams to provide coverage in the respective cells. Depending on the particular cell in which it is located, a UE 205 can communicate with the gNB or ng-eNB serving that particular cell via the NR or LTE radio interface, respectively.

Deployments based on different 3GPP architecture options (e.g., EPC-based or 5GC-based) and UEs with different capabilities (e.g., EPC and 5GC) may coexist at the same time within one network (e.g., PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the core network (CN) by which it is served.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

As discussed above, services can be deployed as part of a network function (NF) in the 5G SBA. This SBA model, which further adopts principles like modularity, reusability and self-containment of NFs, can enable deployments to take advantage of the latest virtualization and software technologies. FIG. 3 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e. signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. Similar to LTE PCRF, PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF) with Nupf interface—supports handling of user plane traffic based on the rules received from SMF, including packet inspection and different enforcement actions (e.g., event detection and reporting).

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g. bytes, seconds) for a service. CHF also interacts with billing systems.

Access and Mobility Management Function (AMF, with Namf interface) terminates the RAN CP interface and handles all mobility and connection management of UEs (similar to MME in EPC).

Network Exposure Function (NEF) with Nnef interface—acts as the entry point into operator's network, by securely exposing to AFs the network capabilities and events provided by 3GPP NFs and by providing ways for the AF to securely provide information to 3GPP network.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g. compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

The Unified Data Management (UDM) function shown in FIG. 3 is similar to the HSS in LTE/EPC networks discussed above. UDM supports Generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

If a service (or all services for a user) is under credit control, when the CHF provides the SMF a final quota, the CHF may also indicate (e.g., in Final-Unit-Action) the action to be taken in the SMF/UPF when the quota for a service is exhausted (also referred to as "out of credit"). However, if the AF is informed that a particular service is out of credit and an action (indicated in Final-Unit-Action) that allows traffic while throttling or redirection to a portal for credit refill is applied at the SMF/UPF, the AF may decide not to terminate the service but instead wait for a refill and take temporary actions during the throttling. This can create various problems, issues, and/or difficulties for the AF when credit is refilled and/or reallocated.

SUMMARY

Examples of the present disclosure provide specific improvements to secure communication between applications (e.g., clients) and application functions (e.g., servers), such as by facilitating solutions to overcome the exemplary problems summarized above and described in more detail below Exemplary examples include methods (e.g., procedures) performed by an application function (AF) for a communication network (e.g., EPC, 5GC). The AF can be hosted and/or provided by one or more network nodes in or associated with the communication network.

These exemplary methods can include sending a subscription request, to a network function (NF), for notifications about out-of-credit and reallocation-of-credit events associated with one or more users of a service provided by the AF. In various examples, the NF can be one of the following: a policy control function (PCF) of a 5GC; a session management function (SMF) of the 5GC; a policy and charging rules function (PCRF) of an EPC; or a policy control enforcement function (PCEF) of the EPC.

In some examples, the subscription request for notifications about out-of-credit events can include one or more service requirements applicable before an out-of-credit event.

In some examples, the subscription request for notifications about reallocation-of-credit events can include an indication of whether the communication network should revert to the one or more service requirements after a reallocation-of-credit event.

These exemplary methods can also include, in response to a first notification from the NF of an out-of-credit event associated with one of the users, performing one or more first actions with respect to the service. In some examples, the first notification can include an indication of one or more third actions to be performed by the communication network on data flows associated with the service, based on the out-of-credit event. In such examples, the first actions on the service can be based on the third actions to be performed on the data flows associated with the service.

In some examples, performing the first actions can include the AF performing one or more of the following: terminating the service; terminating one or more data flows associated with the service; creating a further data flow for the service with downgraded QoS; and dynamically adapting media codecs associated with the service.

These exemplary methods can also include, in response to a second notification from the NF of a reallocation-of-credit event associated with the user, performing one or more second actions with respect to the service. In some examples, the second notification can include an indication of one or more fourth actions to be performed by the communication network on data flows associated with the service, based on the reallocation-of-credit event. In such examples, the second actions on the service can be based on the fourth actions to be performed on the data flows associated with the service.

It is noted that the fourth action may be equal to the third action, or cancel the third action as a whole.

In some examples, performing the second actions can include the AF performing one or more of the following: restoring a service QoS available before the out-of-credit event; terminating one or more data flows associated with the service; upgrading the QoS of an existing data flow; creating a further data flow for the service with upgraded QoS; and dynamically adapting media codecs associated with the service.

Other exemplary examples include methods (e.g., procedures) performed by a network function (NF) for a communication network (e.g., EPC, 5GC). The NF can be hosted and/or provided by one or more network nodes in or associated with the communication network.

These exemplary methods can include receiving a subscription request, from an application function (AF), for notifications about out-of-credit and reallocation-of-credit events associated with one or more users of a service provided by the AF. In some examples, the subscription request for notifications about out-of-credit events can include one or more service requirements applicable before an out-of-credit event. In some examples, the subscription request for notifications about reallocation-of-credit events can include an indication of whether the communication network should revert to the one or more service requirements after a reallocation-of-credit event.

These exemplary methods can also include detecting an out-of-credit event associated with one of the users; sending, to the AF, a first notification of the out-of-credit event; subsequently detecting a reallocation-of-credit event associated with the user; and sending, to the AF, a second notification of the reallocation-of-credit event.

In some examples, the NF can be a session management function (SMF) of a 5GC or a policy control enforcement function (PCEF) of an EPC. In such examples, detecting the out-of-credit event can include receiving, from a charging function in the communication network, a first indication of a final unit of credit quota associated with the user and a second indication of one or more actions to be performed, by the SMF, once the credit quota is consumed. In such examples, detecting the reallocation-of-credit event can include the receiving, from the charging function, a third indication of a refilling of a credit quota associated with the user. In various examples, the charging function can be a CHF associated with a 5GC or an OCS associated with an EPC.

In other examples, the NF can be a policy control function (PCF) of a 5GC or a policy and charging rules function (PCRF) of an EPC. In such examples, detecting the out-of-credit event can include receiving, from a further NF in the communication network, a first request for policy control and charging (PCC) rules and a first indication that the request is triggered by an out-of-credit event associated with the user. In various examples, the further NF can be a SMF of a 5GC or a PCEF of an EPC.

In such examples, these exemplary methods can also include determining one or more third actions to be performed, by the NF, on data flows associated with the service based on the out-of-credit event. Furthermore, in such examples, the first notification includes a third indication of the third actions to be performed. For example, the third actions can include any of the following: terminating the service, redirecting the service to a refill portal, and restricting access to the service by allowing only certain data flows.

Also in such examples, detecting the reallocation-of-credit event can include receiving, from the further NF, a second request for policy control and charging (PCC) rules and a second indication that the request is triggered by a reallocation-of-credit event associated with the user. In such examples, these exemplary methods can also include determining one or more fourth actions to be performed, by the NF, on data flows associated with the service based on the reallocation-of-credit event.

Furthermore, in such examples, the second notification includes a fourth indication of the fourth actions to be performed.

In some of these examples, determining the fourth actions can be based on a fifth indication, in the subscription request for notifications about reallocation-of-credit events, of whether the communication network should revert to the one or more service requirements after a reallocation-of-credit event.

Exemplary examples also include application functions (AFs) and network functions (NFs), for a communication network, that are configured to perform operations (e.g., using processing circuitry) corresponding to any of the exemplary methods described herein. Exemplary examples also include non-transitory, computer-readable media storing computer-executable instructions that, when executed by processing circuitry associated with such AFs and NFs, configure the same to perform operations corresponding to any of the exemplary methods described herein.

These and other objects, features, and advantages of examples of the present disclosure will become apparent upon reading the following Detailed Description in view of the Drawings briefly described below.

DETAILED DESCRIPTION

Figure 1:
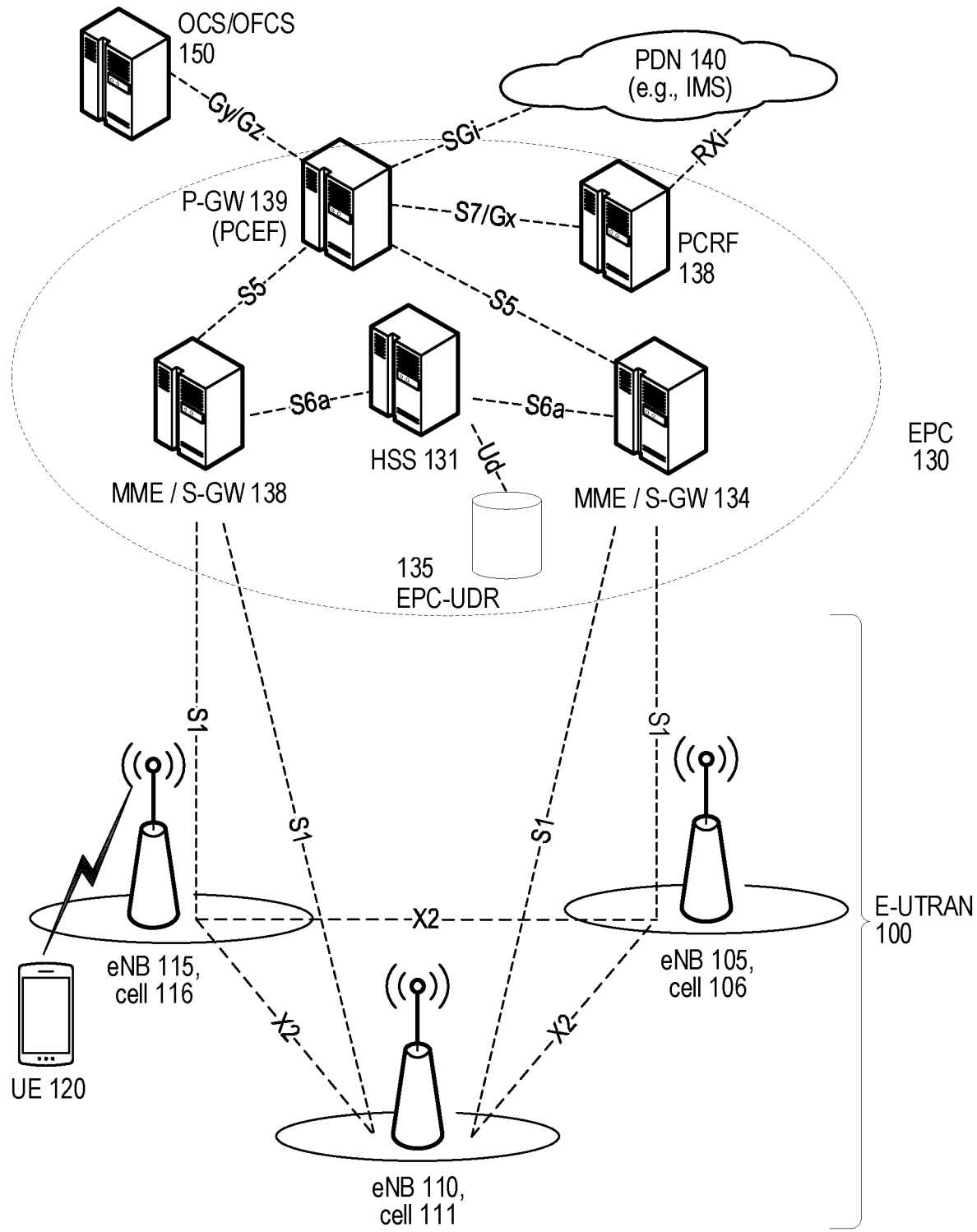
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
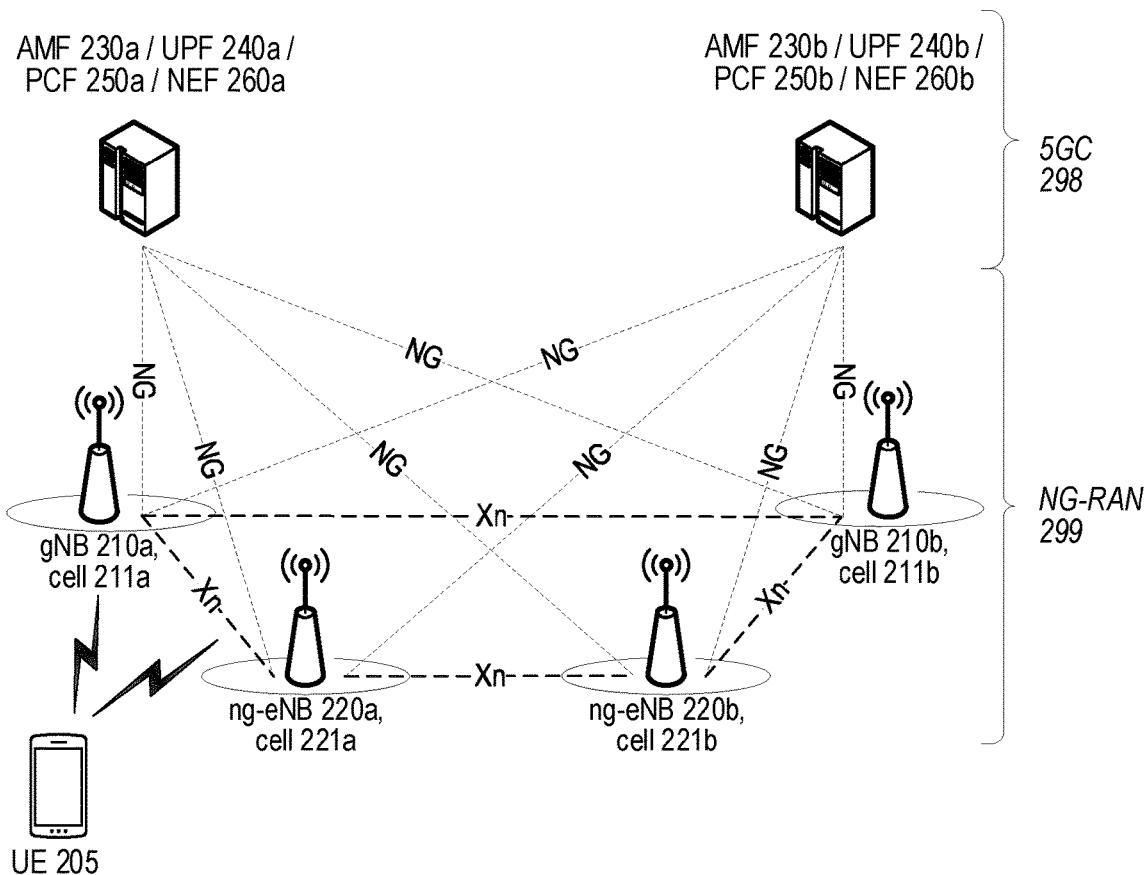
FIG. 2 illustrate an exemplary high-level view of a 5G network architecture.

Some of the examples contemplated herein will now be described more fully with reference to the accompanying drawings.

Other examples, however, are contained within the scope of the subject matter disclosed herein, the disclosed subject matter should not be construed as limited to only the examples set forth herein; rather, these examples are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the examples disclosed herein can be applied to any other example, wherever appropriate. Likewise, any advantage of any of the examples can apply to any other examples, and vice versa. Other objects, features, and advantages of the enclosed examples will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

In the present disclosure, the term "service" is used generally to refer to a set of data, associated with one or more applications, that is to be transferred via a network with certain specific delivery requirements that need to be fulfilled in order to make the applications successful. In the present disclosure, the term "component" is used generally to refer to any component needed for the delivery of the service. Examples of components are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation and storage. In general, each component can have a "manager", a term used generally to refer to an entity that can collect historical information about utilization of resources as well as provide information about the current and the predicted future availability of resources associated with that component (e.g., a RAN manager).

As briefly mentioned above, if an AF is informed that a particular service is out of credit and an action (indicated in Final-Unit-Action) that allows traffic while throttling or redirection to a portal for credit refill is applied at the SMF/UPF, the AF may decide not to terminate the service but instead wait for a refill and take temporary actions during the throttling. This can create various problems, issues, and/or difficulties for the AF when credit is refilled and/or reallocated. This discussed in more detail below.

For example, possible indicated Final-Unit-Actions include terminating the service, redirecting the user to an application server, or restricting access to certain traffic. If an AF wants to be notified of the Out-of-Credit situation together with the Final-Unit-Action decided by the CHF, the AF subscribes to the Out-Of-Credit event which results in the PCF provisioning Out-of-Credit policy trigger to SMF. When a credit quota is exhausted, the SMF notifies a subscribed PCF about the "out of credit" situation. The PCF may need to re-evaluate the policy according to Final-Unit-Action, including taking any of the following actions:

Removing the PCC rule;
Modifying the PCC rule (e.g. throttle the traffic for future accesses);
Activating another PCC rule (e.g. a PCC rule related to a restricted service);
Deriving service analytics for statistics or adaptation of service conditions; or
When the out of credit service corresponds with a dynamic PCC rule, informing the AF that requested this service and subscribed to receive this information. The SMF provides a Session Management Event Exposure Service, as defined in 3GPP TS 23.502 and 3GPP TS 23.503. This service allows consumer NFs to subscribe and unsubscribe for events on a PDU session, and also notifies consumer NFs with a corresponding subscription about observed events on the PDU session. Types of observed events applicable for (H-)SMF include: user plane (UP) path change (e.g. addition and/or removal of PDU session anchor), access type change, PLMN change, PDU session release, downlink (DL) data delivery status, UE IP address/prefix change, and QoS flow level network data.

It is also possible to have specific behaviours based on SLAs. For example, based on configuration in the SMF, the termination or any other action on the service related to the out-of-credit condition is delegated to the PCF (and possibly AF). More specifically, upon receiving the notification of "Out of Traffic" from the SMF, the PCF decides the service is not terminated but the PCF throttles the service traffic. An authorized time between the consumption of the whole quota and the refilling can also be configured. During this time, it is possible that the service is kept with the same or limited bandwidth, to the same server or to a redirected one.

If the AF subscribed to be informed, the PCF will then send the Out-of-Credit notification to the AF. The AF will use this information to control on the actions on that service, including:

Immediate termination of the AF session (with consequent PCF removal of the corresponding dynamic PCC rules);
Service offer adaptation including access to fewer services (e.g. removing out-of-credit flows and activating flows compatible with notified restricted services), downgrading required QoS for the out-of-credit service, downgrading user category, etc.;
Notification to the UE for the new service conditions and offers;
Service-related analytics; and/or
When the PCF performs throttling of the requested service, codec adaptation according to the downgraded QoS.

It is also possible that the SMF informs the PCF when the credit has been refilled, replenished, and/or reallocated. For some of the out of credit behaviours described above, the PCF needs to know when the condition has changed (e.g., when the user has replenished the credit for the PCC rules) so that some of the actions taken due to the out of credit condition can be reverted. For example, based on notification of reallocation, the PCF could modify the PCC rule to the original value or to a new value, update service analytics, reset a timer so that the UE will not suffer service degradation (if the replenishment was done in an authorized time), etc. Such functionality was recently specified for 5GC and was available for EPC in earlier releases.

Even so, upon notification of the out-of-credit condition, an AF may decide not to terminate the service but instead wait for a refill and take temporary actions temporarily during the throttling. However, the AF is generally unable to revert or take further actions when the credit is reallocated. For example, service specific limitations cannot be removed, such as reactivating previously deactivated premium services, requesting an upgrade of a downgraded service, changing of user category, etc. Likewise, service-related analytics cannot be updated, and codec adaptations according to the downgraded QoS cannot be reverted. This problem applies to both 5GC and EPC.

Similar problems can occur in other scenarios related to user credit management. For example, it is possible that, once a user replenishes credit, an AF wants the network to revert to applying policies according to normal conditions, e.g., based on the situation before the user ran out of credit. However, there is no way to make the PCF aware of the AF's expectations from the AF and reach the desired result.

In general, current techniques for addressing such scenarios require that the PCF must be involved for the AF to be informed of the credit status. For example, the SMF must notify the PCF first and then the PCF notifies the AF. AFs are unable to receive the notification directly from SMF, or even subscribe to notifications by the SMF. Even so, there are scenarios where the PCC architecture is not deployed and/or there are no specific policies that require the PCF to be informed of the credit status. In such scenarios, the AF cannot become aware of the credit status as required.

Accordingly, exemplary examples of the present disclosure provide techniques that facilitate an AF to request, from the operator core network (e.g., EPC or 5GC), information about an out of credit condition for a particular service along with information about reallocation of credit for the service. In addition, examples enable the AF to indicate its preferences for the handling of the service in the operator network.

Exemplary examples of the present disclosure provide various benefits, advantages, and/or solutions to problems, including those described herein. First, examples enable an AF to be aware (e.g., through network analytics) of how a service is being used and act accordingly, not only when the UE consumes all the credit but also when new credit is reallocated. For example, codecs can be adapted properly according to the operator demands on service bandwidth. Likewise, a service provider will be able to adapt a credit-based service offering such that the service is not interrupted upon out-of-credit, retaining the end user and incentivizing the end user to quickly refill credits usable for the service. In addition, a service provider will be able to indicate its preferences in advance for when the credit is reallocated, thereby reducing signaling and giving hints to the operator for the handling of the service. At a high level, examples involve three primary aspects. First, examples make an AF aware of the credit reallocation via the PCF. Second, examples enable an AF to inform a PCF about reversion of actions taken by the AF in response to the user's out-of-credit condition, after the PCF becomes aware of reallocation of credit. Third, examples provide Out-of-Credit and Reallocation-of-Credit as Events triggered by an SMF service, e.g., Nsmf_EventExposure.

Figure 3:
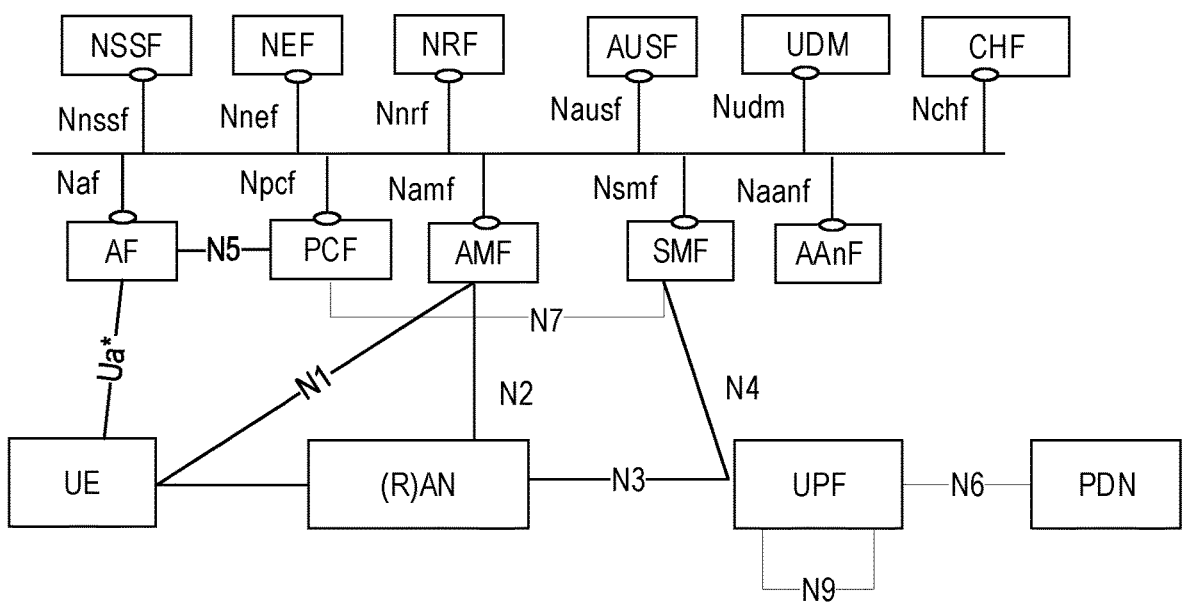
FIG. 3 shows an exemplary non-roaming 5G reference architectures with service-based interfaces and various network functions (NFs) in a core network, as further described in 3GPP TS 23.501 (v16.1.0).

Examples associated with the first aspect can facilitate the AF to request notification about the reallocation of credit for certain services. A new event can be defined for that purpose. For example, in EPC, on the Rx interface between PCRF and an AF, a new value for the Specific-Action AVP called "REALLOCATION_OF_CREDIT" can be included. As another example, in 5GC, on the N5 interface between PCF and AF (shown in FIG. 3), a new event is included within "evSubsc" attribute with the "event" attribute set to the value "REALLOCATION_OF_CREDIT".

When the PCF receives the corresponding Policy Control Request Trigger from SMF via N7 interface (shown in FIG. 3), it will take the required actions according to the operator policies. In addition, the PCF will check if the AF has subscribed to the corresponding event/specific action over N5 interface between PCF and AF. If the AF has subscribed, the PCF notifies the AF. Upon reception of the event information, the AF will check the action to apply according to operator policies. For example, the AF can remove service specific limitations (e.g., access to fewer services, downgrade of user category, etc.) and/or revert codec adaptations for downgraded QoS made in response to the out-of-credit condition. Moreover, service-related analytics can be updated in the AF or in the PCF.

According to examples associated with the second aspect, when an AF subscribes to the out-of-credit event, the AF may provide instructions to the PCF on whether the actions, taken in the operator network when detecting the user out-of-credit event, are reverted once there is a reallocation of credit. According to these examples, at subscription of the out-of-credit event, the AF may include some service requirements that apply when the out-of-credit event occurs. Likewise, at subscription to the reallocation-of-credit event, the AF may include a further indication "revertInd" (a flag) that indicates whether reversion to the service requirements should occur upon the reallocation-of-credit event. For example, the "revertInd" can be a Revert-Indication AVP in N5/Rx interfaces. In some examples, the indication can by accompanied by event-related information.

When the reallocation-of-credit event is met (and optionally the additional event-related information), the PCF reverts the actions taken at the out-of-credit event to the applicable actions when the credit is reallocated. For example, when the PCF is informed about the reallocation-of-credit, the PCF checks if the indication of reversion of actions ("revertInd") was provided by the AF. If so, the PCF will consider that information when evaluating the policy decision to apply, e.g., it can reinstall/modify the PCC rules that were applicable before the out-of-credit condition was met. For example, the PCF can apply an access type change according to the policies applicable before the out-of-credit condition occurred.

Examples associated with the third aspect concern scenarios where the PCC architecture is not deployed or when there are no specific policy decisions to be taken in the operator network (e.g., there are no service requirements that demand the reservation of specific network resources). In such scenarios, according to these examples, an AF can subscribe directly in the SMF to be notified about both the out-of-credit and reallocation-of-credit conditions. This subscription can be done via the SMF service Nsmf_EventExposure, by introduction of two new events: out-of-credit and reallocation-of-credit.

When subscribing, the AF can provide either a SUPI (subscription permanent identifier) and/or an identifier of a group of users for which it is interested in getting the information. Alternately, the AF can provide a DNN (data network name, associated with a PDN) if it is interested in getting this information for all the UEs with established PDN connections in that DNN.

When the one of the UEs identified in any of these ways runs out of credit or reallocates new credit, the SMF will initiate a notification towards the AF with an indication of the specific triggered event. In case the AF subscribed to more than one UE, the SMF can indicate the affected SUPI and the related UE address. In response, the AF can take similar actions as if it were notified via the PCC architecture, e.g., possible AF adaptation based on the received events.

Figure 4:
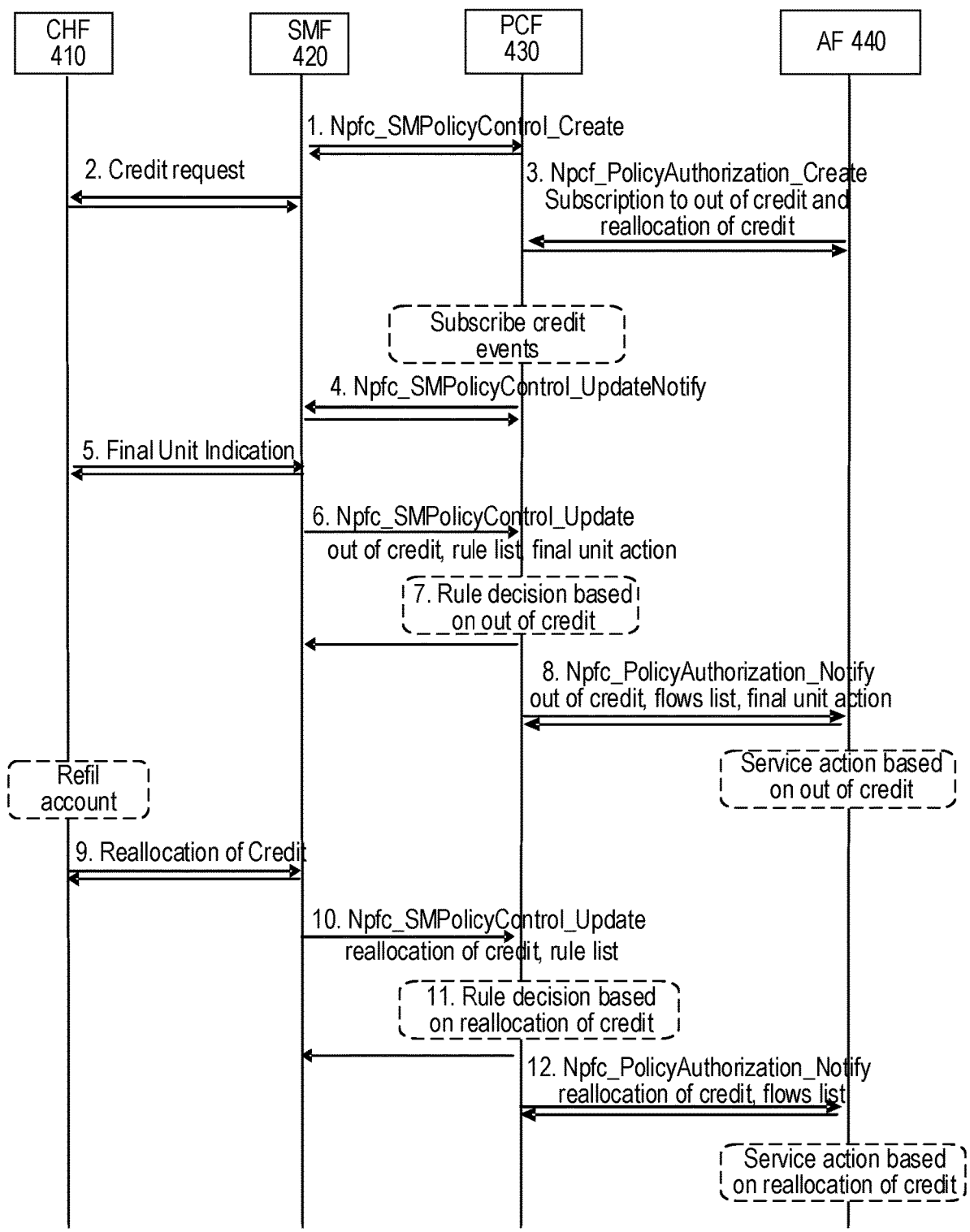
FIG. 4 shows a flow diagram of an exemplary procedure for credit management in a 5GC, according to various exemplary examples of the present disclosure.
Figure 5:
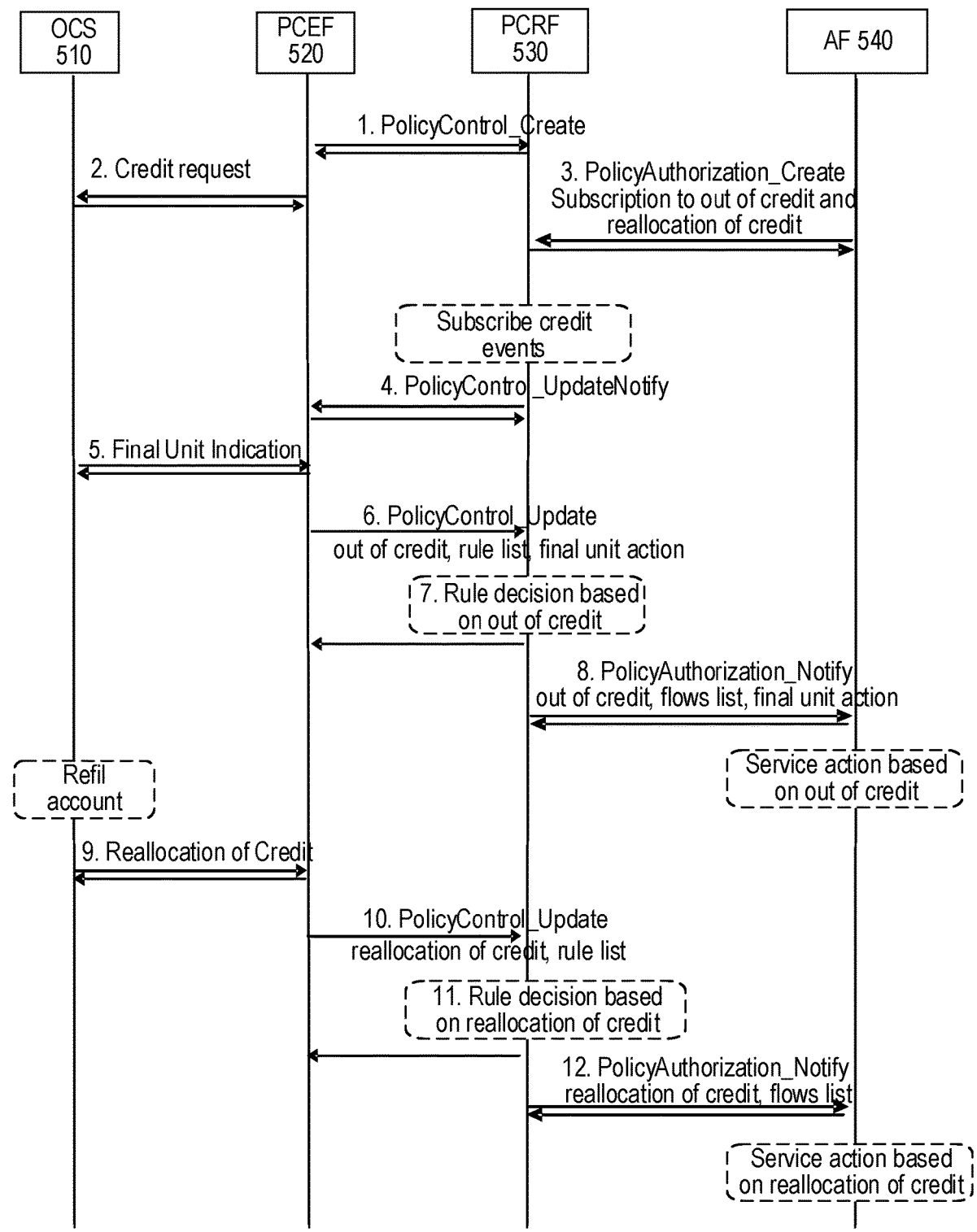
FIG. 5 shows a flow diagram of an exemplary procedure for credit management in a EPC, according to various exemplary examples of the present disclosure.
Figure 6:
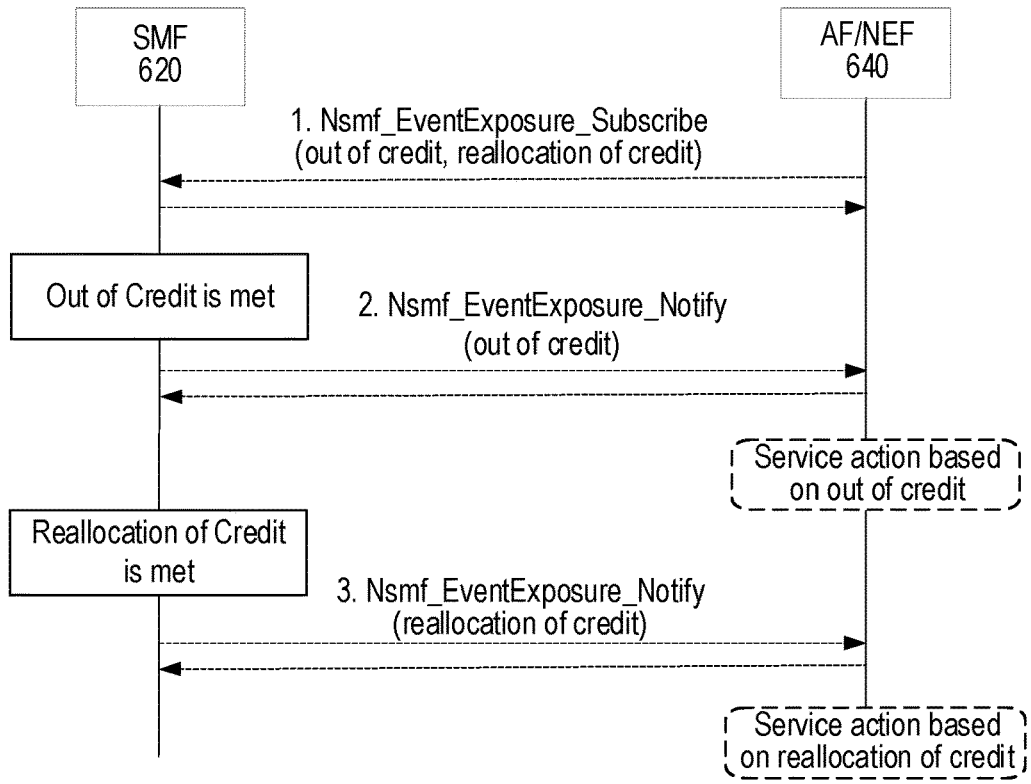
FIG. 6 shows a flow diagram of another exemplary procedure for credit management in a 5GC, according to various exemplary examples of the present disclosure.

FIGS. 4-6 are flow diagram of various exemplary procedures according to various exemplary examples of the present disclosure. Although FIGS. 4-6 show numbered operations, these numbers are used to facilitate description of the procedures and neither require nor imply a particular order of the operations. In other words, the operations shown in FIGS. 4-6 can be performed in a different order than shown, and can be combined and/or divided into operations different than the ones shown.

In particular, FIG. 4 shows a flow diagram of an exemplary procedure for credit management in a 5GC, according to various exemplary examples of the present disclosure. The exemplary procedure involves various operations by, and interactions between, a CHF 410, an SMF 420, a PCF 430, and an AF 440. For brevity, these functions will be referred to without their reference numbers in the following description.

In operations 1-2, at PDU session establishment request, the SMF creates a policy association with the PCF and a credit management session with the CHF. In operation 3, the AF requests network resources to support a service requested by the UE and, within the request, subscribes with the PCF for notification of out-of-credit and reallocation-of-credit events. Within the request, the AF can also provide an indication of whether to revert actions when credit is reallocated, i.e., the "revertInd" discussed above. The PCF saves these subscriptions to the credit-related events.

In operation 4, the PCF provides the SMF the out-of-credit and reallocation-of-credit policy control request triggers to be used. As long as the UE has credit for the usage of network resources by the requested service(s), the CHF provides the corresponding quota(s) to the SMF. In operation 5, however, when the credit is about to be exhausted, the CHF provides the SMF an indication of final unit, including an action to perform once the quota is consumed. Such action could include terminating the service, redirecting the service (e.g., to a refill portal), restricting the access (e.g., allowing only certain flows), etc.

In operation 6, the SMF requests PCC rules from the PCF and indicates the request is triggered because the out-of-credit event is met for one or more PCC rules (due to the final unit indication). Together with the out-of-credit event, the SMF includes the action applied on the affected services. In operation 7, the PCF evaluates what policy decision to apply (e.g., activate/deactivate PCC rules) to the out-of-credit condition and responds to the SMF.

In operation 8, if the AF subscribed to the out-of-credit event for the affected service, the PCF notifies the AF indicating that the out-of-credit event is triggered for one or more service data flows, and includes the action that the CHF requested (e.g., in operation 5) the SMF to apply on the corresponding service data flows. The AF can then take an action for the service based on the out-of-credit event indication, e.g., terminating the service, terminating one or more data flows associated with the service, creating a further data flow for the service with downgraded QoS, dynamically adapting media codecs associated with the service, etc.

At some point, the UE refills the account and new credit for the affected service is available in the CHF. Subsequently, in operation 9, the CHF provides a new quota for the affected service to the SMF, indicating a reallocation of credit. In response, the SMF can clear the action(s) applied for these services in response to the earlier out-of-credit condition. In operation 10, the SMF requests PCC rules from the PCF and indicates the request is triggered because the reallocation-of-credit condition is met for one or more PCC rules.

In operation 11, the PCF evaluates which policy decisions to apply, including activating/deactivating PCC rule(s) to revert actions taken in response to the out-of-credit event, and responds to the SMF. If the AF included the revert indication together with the reallocation-of-credit subscription (e.g., in operation 3), the PCF checks the policy decisions made in operation 7, and if operator policies allow such reversion, the PCF can revert the actions taken due to the out-of-credit condition. For example, the PCF can reinstall/modify the PCC rules applicable before the out-of-credit condition was met.

In operation 12, if the AF subscribed to the reallocation-of-credit event for the affected service, the PCF notifies the AF that the reallocation-of-credit event is met for one or more service data flows. The AF can then take an action on the service based on the reallocation-of-credit indication, e.g., restoring a service QoS available before the out-of-credit event, terminating one or more data flows associated with the service, upgrading the QoS of an existing data flow, creating a further data flow for the service with upgraded QoS, and dynamically adapting media codecs associated with the service, etc.

Although FIG. 4 shows an exemplary procedure involving a 5GC, similar principles can be employed for EPC credit-management procedures. For example, the signal flow shown in FIG. 4 can also be applied to EPC with CHF replaced by OCS, PCF replaced by PCRF, SMF/UPF replaced PCEF (or by PGW-C and PGW-U when Control Plane and User Plane are split), N7 replaced by Gx, and N5 replaced by Rx.

Accordingly, FIG. 5 shows a flow diagram of an exemplary procedure for credit management in an EPC, according to various exemplary examples of the present disclosure. The exemplary procedure involves various operations by, and interactions between, an OCS 510, a PCEF 520, a PCRF 530, and an AF 540. Each numbered or labelled operation in FIG. 5 performs a substantially similar function as an operation in FIG. 4 having the same number or label, and. As such, the description of the operations of FIG. 4 apply equally to FIG. 5. However, the names of messages shown in FIG. 5 are exemplary and are intended to be generally illustrative of the function, purpose, and/or source/destination of such messages.

In addition, FIG. 6 shows a flow diagram of another exemplary procedure for credit management in a 5GC, according to various exemplary examples of the present disclosure. The exemplary procedure involves various operations by, and interactions between an SMF 620 and an AF 640. For brevity, these functions will be referred to without their reference numbers in the following description.

More specifically, FIG. 6 relates to examples associated with the third aspect discussed above, where the PCC architecture is not deployed or when there are no specific policy decisions to be taken in the operator network. According to these examples, an AF can subscribe directly in the SMF to be notified about both the out-of-credit and reallocation-of-credit conditions.

In operation 1, the AF subscribes with the SMF for notification of out-of-credit and reallocation-of-credit events. When subscribing, the AF can provide a SUPI (for a single user) and/or an identifier of a group of users for which it is interested in getting the information. Alternately, the AF can provide a DNN (data network name, associated with a PDN) if it is interested in getting this information for all the UEs with established PDN connections in that DNN. The SMF saves these AF subscriptions to the credit-related events.

Subsequently, an out-of-credit condition occurs for a UE matching the AF's earlier subscription. In operation 2, the SMF notifies the AF of the out-of-credit event, and includes the action applied by the SMF on the affected service(s). The AF responds and can then take any action for the service based on the out-of-credit event indication, e.g., terminating the service, terminating one or more data flows associated with the service, creating a further data flow for the service with downgraded QoS, dynamically adapting media codecs associated with the service, etc.

Subsequently, a reallocation-of-credit condition occurs for a UE matching the AF's earlier subscription. In operation 3, the SMF notifies the AF of the out-of-credit event, and includes any action applied by the SMF on the affected service(s). The AF responds and can then take an action for the service based on the reallocation-of-credit event indication, e.g., restoring a service QoS available before the out-of-credit event, terminating one or more data flows associated with the service, upgrading the QoS of an existing data flow, creating a further data flow for the service with upgraded QoS, dynamically adapting media codecs associated with the service, etc.

Figure 7:
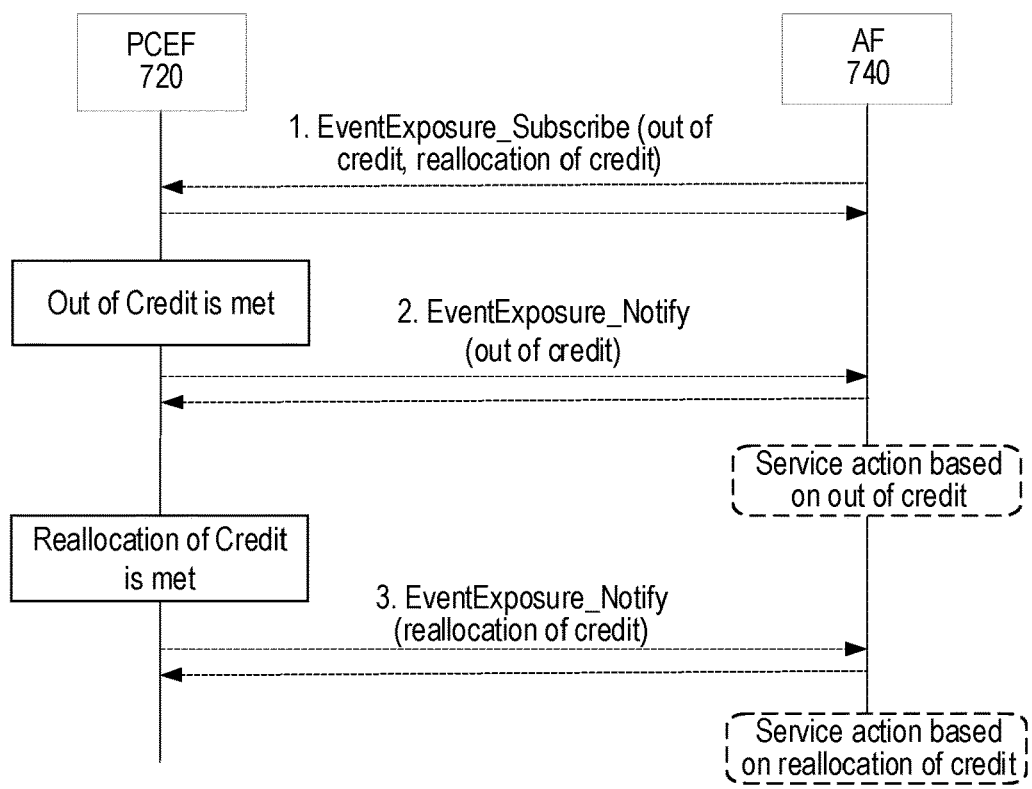
FIG. 7 shows a flow diagram of another exemplary procedure for credit management in a 5GC, according to various exemplary examples of the present disclosure.

Although FIG. 6 shows an exemplary procedure involving a 5GC, similar principles can be employed for EPC credit-management procedures. For example, the signal flow shown in FIG. 6 can also be applied to EPC with SMF replaced PCEF. Accordingly, FIG. 7 shows a flow diagram of an exemplary procedure for credit management in an EPC, according to various exemplary examples of the present disclosure. The exemplary procedure involves various operations by, and interactions between a PCEF 720 and an AF 740. Each numbered or labelled operation in FIG. 7 performs a substantially similar function as an operation in FIG. 6 having the same number or label, and. As such, the description of the operations of FIG. 6 apply equally to FIG. 7. However, the names of messages shown in FIG. 7 are exemplary and are intended to be generally illustrative of the function, purpose, and/or source/destination of such messages.

The examples described above can be further illustrated by the exemplary methods (e.g., procedures) shown in FIGS. 8-9, described below. For example, features of various examples discussed above are included in various operations of the exemplary methods shown in FIGS. 8-9.

Figure 8:
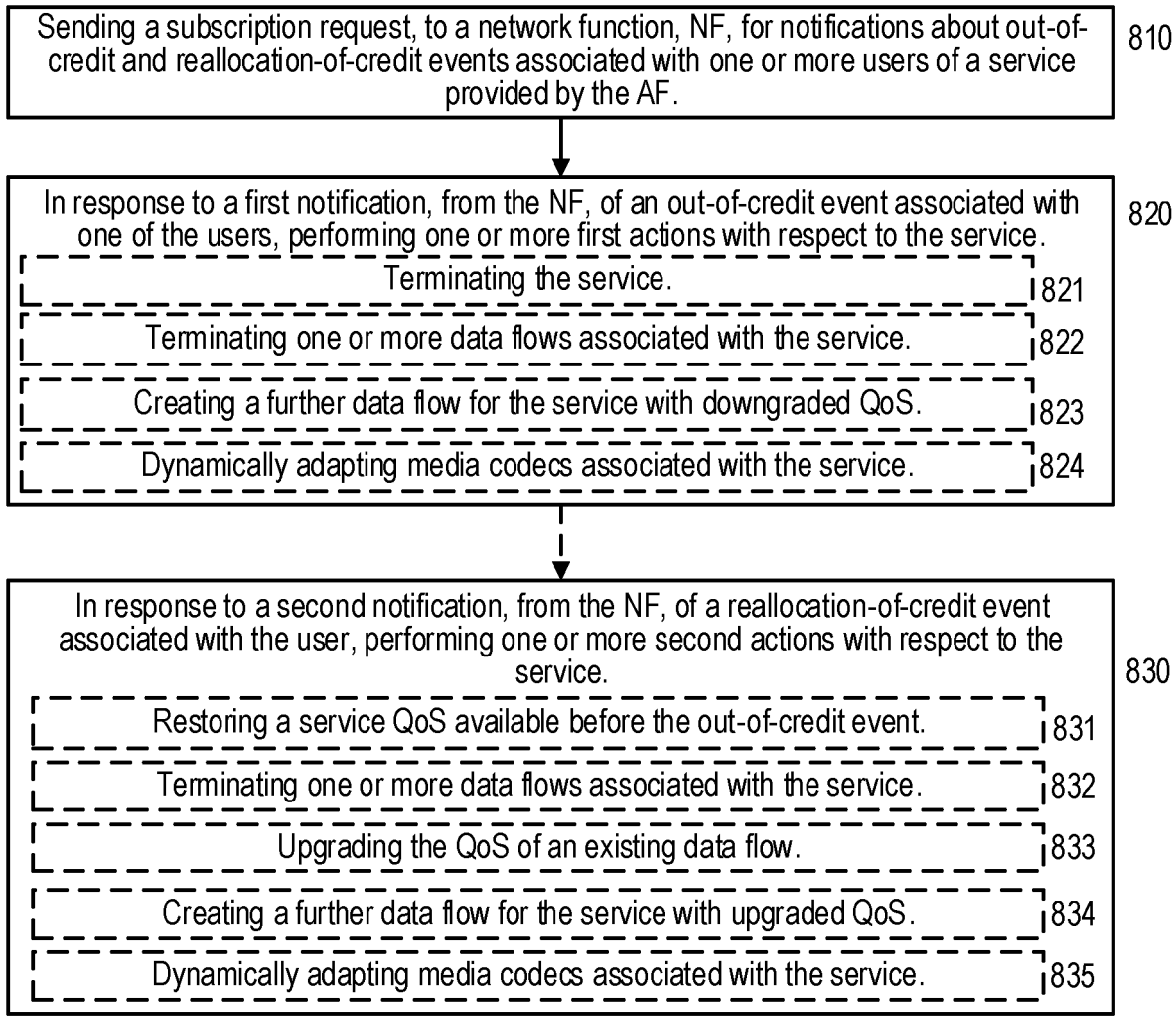
FIG. 8 illustrates an exemplary method (e.g., procedure) performed by an application function (AF) in a communication network (e.g., 5GC, EPC), according to various exemplary examples of the present disclosure.

More specifically, FIG. 8 illustrates an exemplary method (e.g., procedure) performed by performed by an application function (AF) for a communication network (e.g., EPC, 5GC), according to various exemplary examples of the present disclosure. The AF can be hosted and/or provided by one or more network nodes in or associated with the communication network, such as described elsewhere herein. Although the exemplary method is illustrated in FIG. 8 by specific blocks in a particular order, the operations corresponding to the blocks can be performed in different orders than shown and can be combined and/or divided into blocks and/or operations having different functionality than shown. Furthermore, the exemplary method shown in FIG. 8 can be complementary to other exemplary disclosed herein (e.g., FIGS. 4-7, 9), such that they can be used cooperatively to provide benefits, advantages, and/or solutions to problems described herein. Optional blocks and/or operations are indicated by dashed lines.

The exemplary method can include the operations of block 810, in which the AF can send a subscription request, to a network function (NF), for notifications about out-of-credit and reallocation-of-credit events associated with one or more users of a service provided by the AF. In various examples, the NF can be one of the following: a policy control function (PCF) of a 5GC (e.g., as shown in FIG. 4); a session management function (SMF) of the 5GC (e.g., as shown in FIG. 6); a policy and charging rules function (PCRF) of an EPC (e.g., as shown in FIG. 5); or a policy control enforcement function (PCEF) of the EPC (e.g., as shown in FIG. 7).

In some examples, the subscription request for notifications about out-of-credit events can include one or more service requirements applicable before an out-of-credit event. In some examples, the subscription request for notifications about reallocation-of-credit events can include an indication of whether the communication network should revert to the one or more service requirements after a reallocation-of-credit event.

The exemplary method can also include the operations of block 820, in which the AF can, in response to a first notification from the NF of an out-of-credit event associated with one of the users, perform one or more first actions with respect to the service. In some examples, the first notification can include an indication of one or more third actions to be performed by the communication network on data flows associated with the service, based on the out-of-credit event. In such examples, the first actions on the service can be based on the third actions to be performed on the data flows associated with the service.

In some examples, performing the first actions can include the AF performing one or more of the following: terminating the service (e.g., in sub-block 821); terminating one or more data flows associated with the service (e.g., in sub-block 822); creating a further data flow for the service with downgraded QoS (e.g., in sub-block 823); and dynamically adapting media codecs associated with the service (e.g., in sub-block 824).

The exemplary method can also include the operations of block 830, in which the AF can, in response to a second notification from the NF of a reallocation-of-credit event associated with the user, perform one or more second actions with respect to the service. In some examples, the second notification can include an indication of one or more fourth actions to be performed by the communication network on data flows associated with the service, based on the reallocation-of-credit event. In such examples, the second actions on the service can be based on the fourth actions to be performed on the data flows associated with the service.

In some examples, performing the second actions can include the AF performing one or more of the following: restoring a service QoS available before the out-of-credit event (e.g., in sub-block 831); terminating one or more data flows associated with the service (e.g., in sub-block 832); upgrading the QoS of an existing data flow (e.g., in sub-block 833); creating a further data flow for the service with upgraded QoS (e.g., in sub-block 834); and dynamically adapting media codecs associated with the service (e.g., in sub-block 835).

Figure 9:
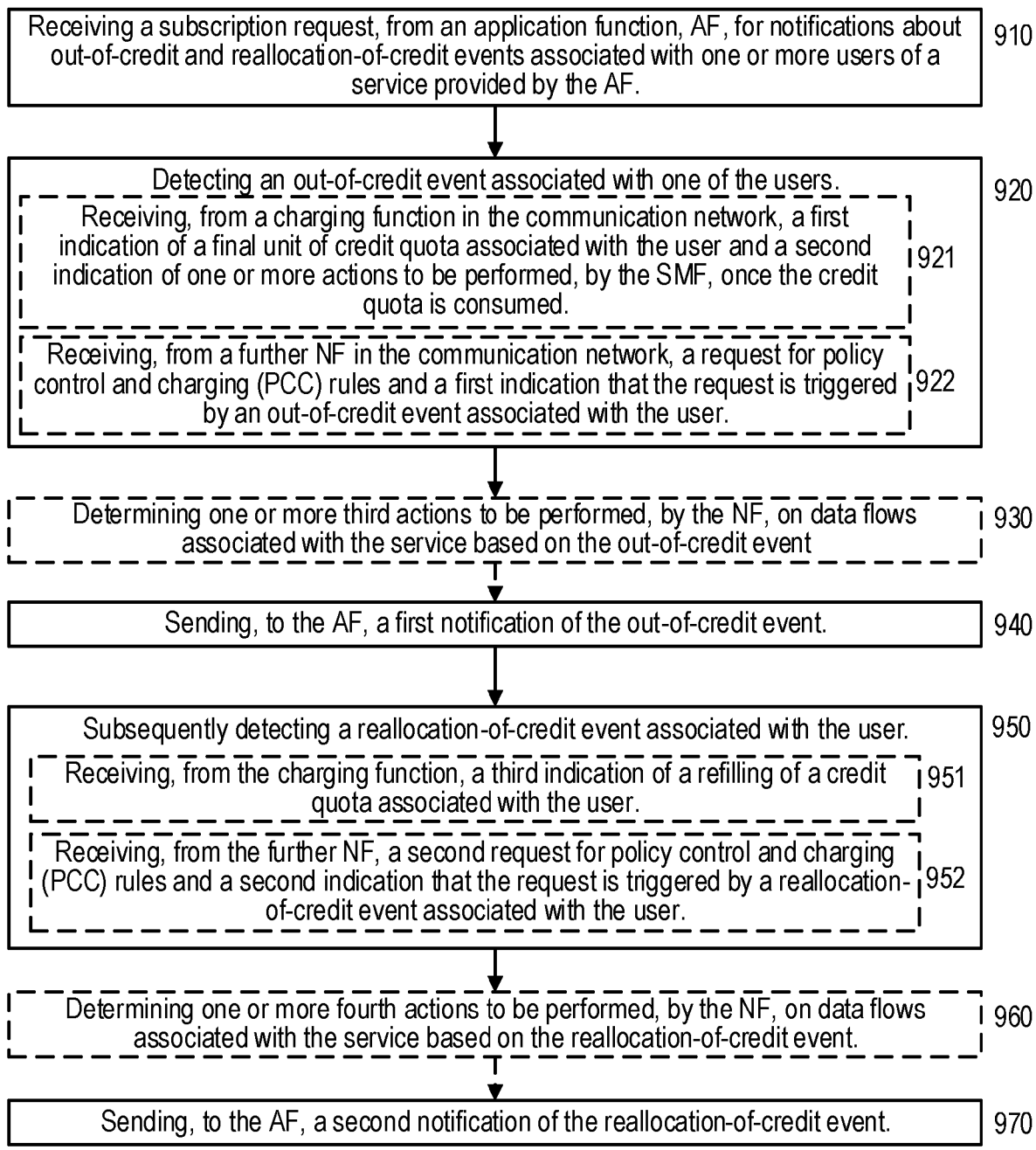
FIG. 9 illustrates an exemplary method (e.g., procedures) performed by a network function (NF, e.g., PCF, SMF, PCRF, PCEF) in a communication network (e.g., 5GC, EPC), according to various exemplary examples of the present disclosure.

In addition, FIG. 9 illustrates an exemplary method (e.g., procedure) performed by a network function (NF) for a communication network (e.g., EPC, 5GC), according to various exemplary examples of the present disclosure. The NF can be hosted and/or provided by one or more network nodes in or associated with the communication network, such as described elsewhere herein. Although the exemplary method is illustrated in FIG. 9 by specific blocks in a particular order, the operations corresponding to the blocks can be performed in different orders than shown and can be combined and/or divided into blocks and/or operations having different functionality than shown.

Furthermore, the exemplary method shown in FIG. 9 can be complementary to other exemplary methods disclosed herein (e.g., FIGS. 4-8), such that they can be used cooperatively to provide benefits, advantages, and/or solutions to problems described herein. Optional blocks and/or operations are indicated by dashed lines.

The exemplary method can include the operations of block 910, in which the NF can receive a subscription request, from an application function (AF), for notifications about out-of-credit and reallocation-of-credit events associated with one or more users of a service provided by the AF. In some examples, the subscription request for notifications about out-of-credit events can include one or more service requirements applicable before an out-of-credit event. In some examples, the subscription request for notifications about reallocation-of-credit events can include an indication of whether the communication network should revert to the one or more service requirements after a reallocation-of-credit event.

The exemplary method can also include the operations of blocks 920, 940-950, and 970. In block 920, the NF can detect an out-of-credit event associated with one of the users. In block 940, the NF can send, to the AF, a first notification of the out-of-credit event. In block 950, the NF can subsequently detect a reallocation-of-credit event associated with the user. In block 970, the NF can send, to the AF, a second notification of the reallocation-of-credit event.

In some examples, the NF can be a session management function (SMF) of a 5GC (e.g., as shown in FIG. 6) or a policy control enforcement function (PCEF) of an EPC (e.g., as shown in FIG. 7). In such examples, the detecting operations of block 920 can include the operations of sub-block 921, where the NF can receive, from a charging function in the communication network, a first indication of a final unit of credit quota associated with the user and a second indication of one or more actions to be performed, by the SMF, once the credit quota is consumed. In such examples, the detecting operations of block 950 can include the operations of sub-block 951, where the NF can receive, from the charging function, a third indication of a refilling of a credit quota associated with the user. In various examples, the charging function can be a CHF associated with a 5GC (e.g., CHF 410 shown in FIG. 4) or an OCS associated with an EPC (e.g., OCS 510 shown in FIG. 5).

In other examples, the NF can be a policy control function (PCF) of a 5GC (e.g., as shown in FIG. 4) or a policy and charging rules function (PCRF) of an EPC (e.g., as shown in FIG. 5). In such examples, the detecting operations of block 920 can include the operations of sub-block 922, where the NF can receive, from a further NF in the communication network, a first request for policy control and charging (PCC) rules and a first indication that the request is triggered by an out-of-credit event associated with the user. In various examples, the further NF can be a SMF of a 5GC (e.g., SMF 420 shown in FIG. 4) or a PCEF of an EPC (e.g., PCEF 520 shown in FIG. 5).

In such examples, the exemplary method can also include the operations of block 930, where the NF can determine one or more third actions to be performed, by the NF, on data flows associated with the service based on the out-of-credit event. Furthermore, in such examples, the first notification includes a third indication of the third actions to be performed. For example, the third actions can include any of the following: terminating the service, redirecting the service to a refill portal, and restricting access to the service by allowing only certain data flows. Also in such examples, the detecting operations of block 950 can include the operations of sub-block 952, where the NF can receive, from the further NF, a second request for policy control and charging (PCC) rules and a second indication that the request is triggered by a reallocation-of-credit event associated with the user. In such examples, the exemplary method can also include the operations of block 960, where the NF can determine one or more fourth actions to be performed, by the NF, on data flows associated with the service based on the reallocation-of-credit event. Furthermore, in such examples, the second notification includes a fourth indication of the fourth actions to be performed.

In some of these examples, determining the fourth actions (e.g., in block 960) can be based on a fifth indication, in the subscription request for notifications about reallocation-of-credit events, of whether the communication network should revert to the one or more service requirements after a reallocation-of-credit event. An example of such a fifth indication is the "revertInd" discussed above. Although the subject matter described herein can be implemented in any appropriate type of system using any suitable components, the examples disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network can further include any additional elements suitable to support communication between wireless devices or between a wireless device and another communication device, such as a landline telephone, a service provider, or any other network node or end device.

Of the illustrated components, network node 1060 and wireless device (WD) 1010 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some examples, the wireless network can be configured to operate according to specific standards or other types of predefined rules or procedures. Thus, particular examples of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different examples, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs, S-GW, M-GW, etc.), core network functions (e.g., PCEF, PCRF, AMF, UPF, NEF, SMF, PCF, etc.), application functions (AF) associated with the core network, O&M nodes, OSS nodes, SON nodes, positioning nodes (e.g., E-SMLCs), and/or MDTs. As another example, a network node can be a virtual network node as described in more detail below.

More generally, however, network nodes can represent any suitable device (or group of devices) or function capable, configured, arranged, and/or operable to enable and/or provide a wireless device with access to the wireless network or to provide some service to a wireless device that has accessed the wireless network.

Figure 10:
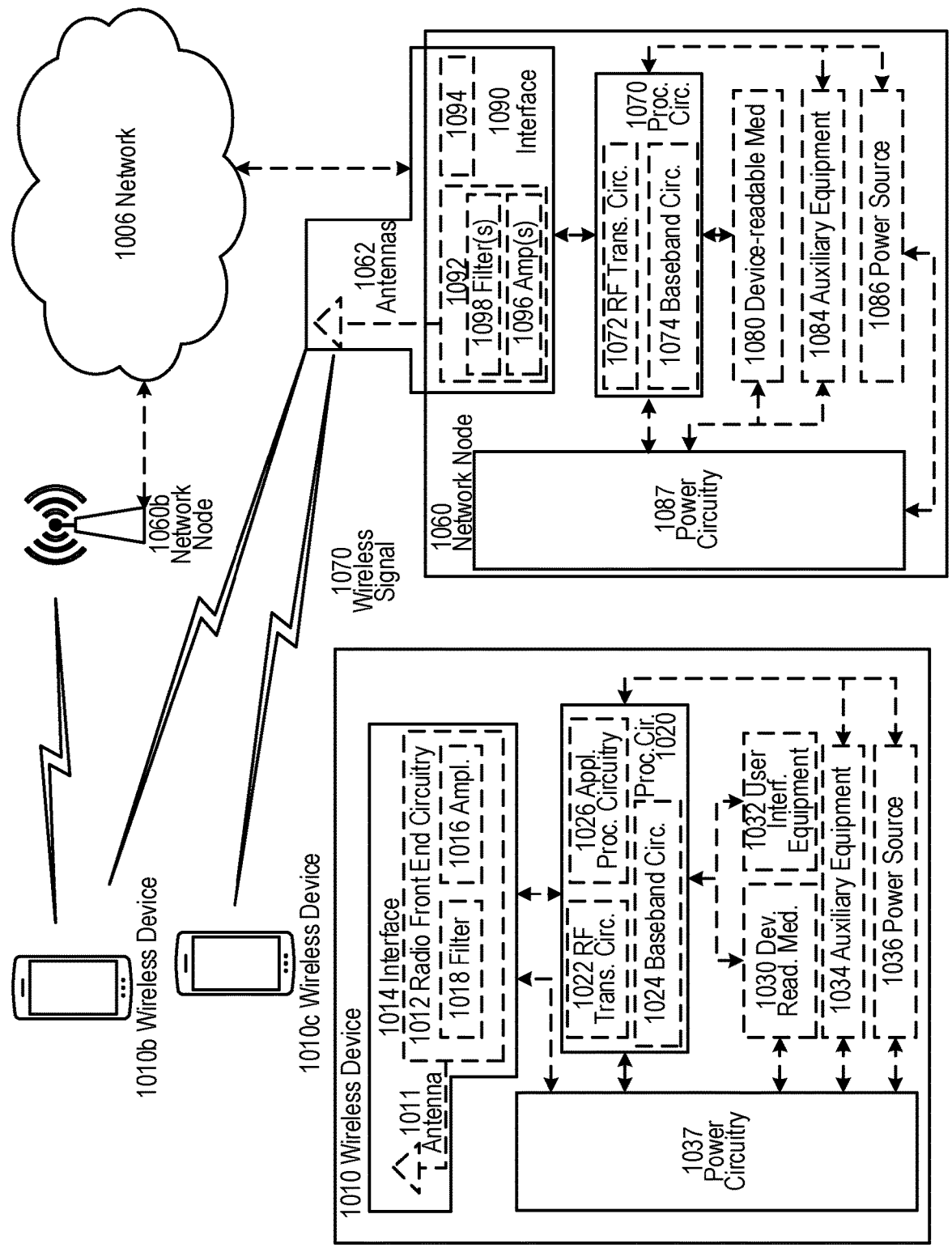
FIG. 10 illustrates an exemplary example of a wireless network, according to various exemplary examples of the present disclosure.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 can represent a device that includes the illustrated combination of hardware components, other examples can comprise network nodes with different combinations of components.

It is to be understood that a network node comprises any suitable combination of hardware and/or software needed to perform the tasks, features, functions and methods and/or procedures disclosed herein. Moreover, while the components of network node 1060 are depicted as single boxes located within a larger box, or nested within multiple boxes, in practice, a network node can comprise multiple different physical components that make up a single illustrated component (e.g., device readable medium 1080 can comprise multiple separate hard drives as well as multiple RAM modules).

Similarly, network node 1060 can be composed of multiple physically separate components (e.g., a NodeB component and an RNC component, or a BTS component and a BSC component, etc.), which can each have their own respective components. In certain scenarios in which network node 1060 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some examples, network node 1060 can be configured to support multiple radio access technologies (RATs). In such examples, some components can be duplicated (e.g., separate device readable medium 1080 for the different RATs) and some components can be reused (e.g., the same antenna 1062 can be shared by the RATs). Network node 1060 can also include multiple sets of the various illustrated components for different wireless technologies integrated into network node 1060, such as, for example, GSM, WCDMA, LTE, NR, WiFi, or Bluetooth wireless technologies. These wireless technologies can be integrated into the same or different chip or set of chips and other components within network node 1060.

Processing circuitry 1070 can be configured to perform any determining, calculating, or similar operations (e.g., certain obtaining operations) described herein as being provided by a network node. These operations performed by processing circuitry 1070 can include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1060, either alone or in conjunction with other network node 1060 components (e.g., device readable medium 1080). Such functionality can include any of the various wireless features, functions, or benefits discussed herein.

For example, processing circuitry 1070 can execute instructions stored in device readable medium 1080 or in memory within processing circuitry 1070. In some examples, processing circuitry 1070 can include a system on a chip (SOC). As a more specific example, instructions (also referred to as a computer program product) stored in medium 1080 can include instructions that, when executed by processing circuitry 1070, can configure network node 1060 to perform operations corresponding to various exemplary methods (e.g., procedures) described herein.

In some examples, processing circuitry 1070 can include one or more of radio frequency (RF) transceiver circuitry 1072 and baseband processing circuitry 1074. In some examples, radio frequency (RF) transceiver circuitry 1072 and baseband processing circuitry 1074 can be on separate chips (or sets of chips), boards, or units, such as radio units and digital units. In alternative examples, part or all of RF transceiver circuitry 1072 and baseband processing circuitry 1074 can be on the same chip or set of chips, boards, or units.

In certain examples, some or all of the functionality described herein as being provided by a network node, base station, eNB or other such network device can be performed by processing circuitry 1070 executing instructions stored on device readable medium 1080 or memory within processing circuitry 1070. In alternative examples, some or all of the functionality can be provided by processing circuitry 1070 without executing instructions stored on a separate or discrete device readable medium, such as in a hard-wired manner. In any of those examples, whether executing instructions stored on a device readable storage medium or not, processing circuitry 1070 can be configured to perform the described functionality. The benefits provided by such functionality are not limited to processing circuitry 1070 alone or to other components of network node 1060 but are enjoyed by network node 1060 as a whole, and/or by end users and the wireless network generally.

Device readable medium 1080 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1070. Device readable medium 1080 can store any suitable instructions, data or information, including a computer program, software, an application including one or more of logic, rules, code, tables, etc. and/or other instructions capable of being executed by processing circuitry 1070 and, utilized by network node 1060. Device readable medium 1080 can be used to store any calculations made by processing circuitry 1070 and/or any data received via interface 1090. In some examples, processing circuitry 1070 and device readable medium 1080 can be considered to be integrated.

Interface 1090 is used in the wired or wireless communication of signaling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that can be coupled to, or in certain examples a part of, antenna 1062. Radio front end circuitry 1092 comprises filters 1098 and amplifiers 1096. Radio front end circuitry 1092 can be connected to antenna 1062 and processing circuitry 1070. Radio front end circuitry can be configured to condition signals communicated between antenna 1062 and processing circuitry 1070. Radio front end circuitry 1092 can receive digital data that is to be sent out to other network nodes or WDs via a wireless connection. Radio front end circuitry 1092 can convert the digital data into a radio signal having the appropriate channel and bandwidth parameters using a combination of filters 1098 and/or amplifiers 1096. The radio signal can then be transmitted via antenna 1062. Similarly, when receiving data, antenna 1062 can collect radio signals which are then converted into digital data by radio front end circuitry 1092. The digital data can be passed to processing circuitry 1070. In other examples, the interface can comprise different components and/or different combinations of components.

In certain alternative examples, network node 1060 may not include separate radio front end circuitry 1092, instead, processing circuitry 1070 can comprise radio front end circuitry and can be connected to antenna 1062 without separate radio front end circuitry 1092. Similarly, in some examples, all or some of RF transceiver circuitry 1072 can be considered a part of interface 1090. In still other examples, interface 1090 can include one or more ports or terminals 1094, radio front end circuitry 1092, and RF transceiver circuitry 1072, as part of a radio unit (not shown), and interface 1090 can communicate with baseband processing circuitry 1074, which is part of a digital unit (not shown).

Antenna 1062 can include one or more antennas, or antenna arrays, configured to send and/or receive wireless signals. Antenna 1062 can be coupled to radio front end circuitry 1090 and can be any type of antenna capable of transmitting and receiving data and/or signals wirelessly. In some examples, antenna 1062 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain examples, antenna 1062 can be separate from network node 1060 and can be connectable to network node 1060 through an interface or port.

Antenna 1062, interface 1090, and/or processing circuitry 1070 can be configured to perform any receiving operations and/or certain obtaining operations described herein as being performed by a network node. Any information, data and/or signals can be received from a wireless device, another network node and/or any other network equipment. Similarly, antenna 1062, interface 1090, and/or processing circuitry 1070 can be configured to perform any transmitting operations described herein as being performed by a network node. Any information, data and/or signals can be transmitted to a wireless device, another network node and/or any other network equipment.

Power circuitry 1087 can comprise, or be coupled to, power management circuitry and can be configured to supply the components of network node 1060 with power for performing the functionality described herein. Power circuitry 1087 can receive power from power source 1086. Power source 1086 and/or power circuitry 1087 can be configured to provide power to the various components of network node 1060 in a form suitable for the respective components (e.g., at a voltage and current level needed for each respective component). Power source 1086 can either be included in, or external to, power circuitry 1087 and/or network node 1060. For example, network node 1060 can be connectable to an external power source (e.g., an electricity outlet) via an input circuitry or interface such as an electrical cable, whereby the external power source supplies power to power circuitry 1087. As a further example, power source 1086 can comprise a source of power in the form of a battery or battery pack which is connected to, or integrated in, power circuitry 1087. The battery can provide backup power should the external power source fail. Other types of power sources, such as photovoltaic devices, can also be used.

Alternative examples of network node 1060 can include additional components beyond those shown in FIG. 10 that can be responsible for providing certain aspects of the network node's functionality, including any of the functionality described herein and/or any functionality necessary to support the subject matter described herein. For example, network node 1060 can include user interface equipment to allow and/or facilitate input of information into network node 1060 and to allow and/or facilitate output of information from network node 1060. This can allow and/or facilitate a user to perform diagnostic, maintenance, repair, and other administrative functions for network node 1060.

In some examples, a wireless device (WD, e.g., WD 1010) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 can include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies can be integrated into the same or different chips or set of chips as other components within WD 1010.

Antenna 1011 can include one or more antennas or antenna arrays, configured to send and/or receive wireless signals, and is connected to interface 1014. In certain alternative examples, antenna 1011 can be separate from WD 1010 and be connectable to WD 1010 through an interface or port. Antenna 1011, interface 1014, and/or processing circuitry 1020 can be configured to perform any receiving or transmitting operations described herein as being performed by a WD. Any information, data and/or signals can be received from a network node and/or another WD. In some examples, radio front end circuitry and/or antenna 1011 can be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020 and can be configured to condition signals communicated between antenna 1011 and processing circuitry 1020. Radio front end circuitry 1012 can be coupled to or a part of antenna 1011. In some examples, WD 1010 may not include separate radio front end circuitry 1012; rather, processing circuitry 1020 can comprise radio front end circuitry and can be connected to antenna 1011. Similarly, in some examples, some or all of RF transceiver circuitry 1022 can be considered a part of interface 1014. Radio front end circuitry 1012 can receive digital data that is to be sent out to other network nodes or WDs via a wireless connection. Radio front end circuitry 1012 can convert the digital data into a radio signal having the appropriate channel and bandwidth parameters using a combination of filters 1018 and/or amplifiers 1016. The radio signal can then be transmitted via antenna 1011. Similarly, when receiving data, antenna 1011 can collect radio signals which are then converted into digital data by radio front end circuitry 1012. The digital data can be passed to processing circuitry 1020. In other examples, the interface can comprise different components and/or different combinations of components.

Processing circuitry 1020 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1010 functionality either alone or in combination with other WD 1010 components, such as device readable medium 1030. Such functionality can include any of the various wireless features or benefits discussed herein.

For example, processing circuitry 1020 can execute instructions stored in device readable medium 1030 or in memory within processing circuitry 1020 to provide the functionality disclosed herein. More specifically, instructions (also referred to as a computer program product) stored in medium 1030 can include instructions that, when executed by processing circuitry 1020, can configure wireless device 1010 to perform operations corresponding to various exemplary methods (e.g., procedures) described herein.

As illustrated, processing circuitry 1020 includes one or more of RF transceiver circuitry 1022, baseband processing circuitry 1024, and application processing circuitry 1026. In other examples, the processing circuitry can comprise different components and/or different combinations of components. In certain examples processing circuitry 1020 of WD 1010 can comprise a SOC. In some examples, RF transceiver circuitry 1022, baseband processing circuitry 1024, and application processing circuitry 1026 can be on separate chips or sets of chips. In alternative examples, part or all of baseband processing circuitry 1024 and application processing circuitry 1026 can be combined into one chip or set of chips, and RF transceiver circuitry 1022 can be on a separate chip or set of chips. In still alternative examples, part or all of RF transceiver circuitry 1022 and baseband processing circuitry 1024 can be on the same chip or set of chips, and application processing circuitry 1026 can be on a separate chip or set of chips. In yet other alternative examples, part or all of RF transceiver circuitry 1022, baseband processing circuitry 1024, and application processing circuitry 1026 can be combined in the same chip or set of chips. In some examples, RF transceiver circuitry 1022 can be a part of interface 1014. RF transceiver circuitry 1022 can condition RF signals for processing circuitry 1020.

In certain examples, some or all of the functionality described herein as being performed by a WD can be provided by processing circuitry 1020 executing instructions stored on device readable medium 1030, which in certain examples can be a computer-readable storage medium. In alternative examples, some or all of the functionality can be provided by processing circuitry 1020 without executing instructions stored on a separate or discrete device readable storage medium, such as in a hard-wired manner. In any of those particular examples, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 can be configured to perform any determining, calculating, or similar operations (e.g., certain obtaining operations) described herein as being performed by a WD. These operations, as performed by processing circuitry 1020, can include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 can be operable to store a computer program, software, an application including one or more of logic, rules, code, tables, etc. and/or other instructions capable of being executed by processing circuitry 1020. Device readable medium 1030 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1020. In some examples, processing circuitry 1020 and device readable medium 1030 can be considered to be integrated.

User interface equipment 1032 can include components that allow and/or facilitate a human user to interact with WD 1010. Such interaction can be of many forms, such as visual, audial, tactile, etc. User interface equipment 1032 can be operable to produce output to the user and to allow and/or facilitate the user to provide input to WD 1010. The type of interaction can vary depending on the type of user interface equipment 1032 installed in WD 1010. For example, if WD 1010 is a smart phone, the interaction can be via a touch screen; if WD 1010 is a smart meter, the interaction can be through a screen that provides usage (e.g., the number of gallons used) or a speaker that provides an audible alert (e.g., if smoke is detected). User interface equipment 1032 can include input interfaces, devices and circuits, and output interfaces, devices and circuits. User interface equipment 1032 can be configured to allow and/or facilitate input of information into WD 1010 and is connected to processing circuitry 1020 to allow and/or facilitate processing circuitry 1020 to process the input information. User interface equipment 1032 can include, for example, a microphone, a proximity or other sensor, keys/buttons, a touch display, one or more cameras, a USB port, or other input circuitry. User interface equipment 1032 is also configured to allow and/or facilitate output of information from WD 1010, and to allow and/or facilitate processing circuitry 1020 to output information from WD 1010. User interface equipment 1032 can include, for example, a speaker, a display, vibrating circuitry, a USB port, a headphone interface, or other output circuitry. Using one or more input and output interfaces, devices, and circuits, of user interface equipment 1032, WD 1010 can communicate with end users and/or the wireless network and allow and/or facilitate them to benefit from the functionality described herein.

Auxiliary equipment 1034 is operable to provide more specific functionality which may not be generally performed by WDs. This can comprise specialized sensors for doing measurements for various purposes, interfaces for additional types of communication such as wired communications etc. The inclusion and type of components of auxiliary equipment 1034 can vary depending on the example and/or scenario.

Power source 1036 can, in some examples, be in the form of a battery or battery pack. Other types of power sources, such as an external power source (e.g., an electricity outlet), photovoltaic devices or power cells, can also be used. WD 1010 can further comprise power circuitry 1037 for delivering power from power source 1036 to the various parts of WD 1010 which need power from power source 1036 to carry out any functionality described or indicated herein. Power circuitry 1037 can in certain examples comprise power management circuitry. Power circuitry 1037 can additionally or alternatively be operable to receive power from an external power source; in which case WD 1010 can be connectable to the external power source (such as an electricity outlet) via input circuitry or an interface such as an electrical power cable. Power circuitry 1037 can also in certain examples be operable to deliver power from an external power source to power source 1036. This can be, for example, for the charging of power source 1036. Power circuitry 1037 can perform any converting or other modification to the power from power source 1036 to make it suitable for supply to the respective components of WD 1010.

Figure 11:
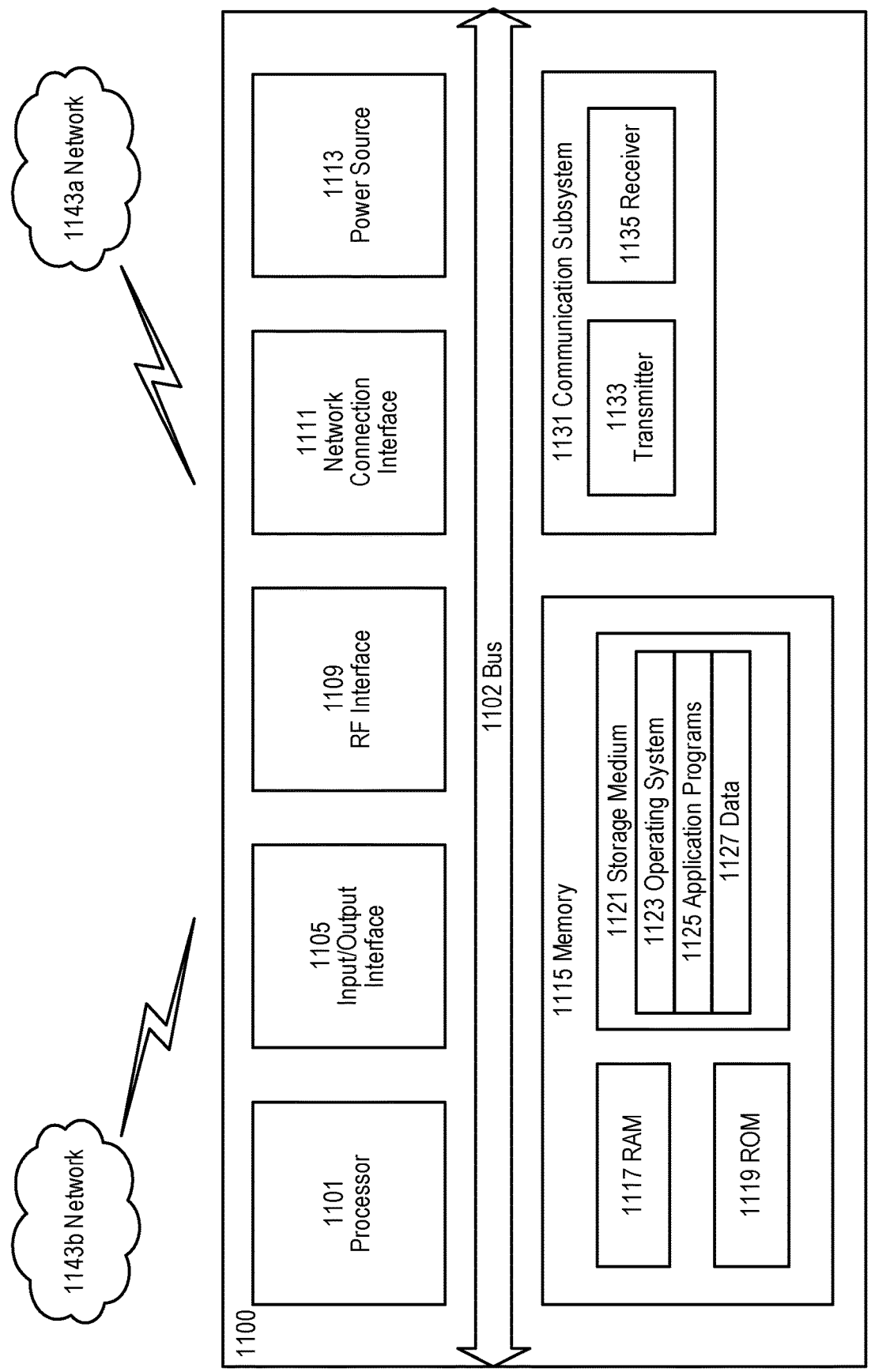
FIG. 11 illustrates an exemplary example of a UE, according to various exemplary examples of the present disclosure.

FIG. 11 illustrates one example of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1100 can be any UE identified by the 3rd Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE can be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other examples, storage medium 1121 can include other similar types of information. Certain UEs can utilize all of the components shown in FIG. 11, or only a subset of the components. The level of integration between the components can vary from one UE to another UE. Further, certain UEs can contain multiple instances of a component, such as multiple processors, memories, transceivers, transmitters, receivers, etc.

In FIG. 11, processing circuitry 1101 can be configured to process computer instructions and data. Processing circuitry 1101 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 can include two central processing units (CPUs). Data can be information in a form suitable for use by a computer.

In the depicted example, input/output interface 1105 can be configured to provide a communication interface to an input device, output device, or input and output device. UE 1100 can be configured to use an output device via input/output interface 1105. An output device can use the same type of interface port as an input device. For example, a USB port can be used to provide input to and output from UE 1100. The output device can be a speaker, a sound card, a video card, a display, a monitor, a printer, an actuator, an emitter, a smartcard, another output device, or any combination thereof. UE 1100 can be configured to use an input device via input/output interface 1105 to allow and/or facilitate a user to capture information into UE 1100. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 11, RF interface 1109 can be configured to provide a communication interface to RF components such as a transmitter, a receiver, and an antenna. Network connection interface 1111 can be configured to provide a communication interface to network 1143a. Network 1143a can encompass wired and/or wireless networks such as a local-area network (LAN), a wide-area network (WAN), a computer network, a wireless network, a telecommunications network, another like network or any combination thereof. For example, network 1143a can comprise a Wi-Fi network. Network connection interface 1111 can be configured to include a receiver and a transmitter interface used to communicate with one or more other devices over a communication network according to one or more communication protocols, such as Ethernet, TCP/IP, SONET, ATM, or the like. Network connection interface 1111 can implement receiver and transmitter functionality appropriate to the communication network links (e.g., optical, electrical, and the like). The transmitter and receiver functions can share circuit components, software or firmware, or alternatively can be implemented separately.

RAM 1117 can be configured to interface via bus 1102 to processing circuitry 1101 to provide storage or caching of data or computer instructions during the execution of software programs such as the operating system, application programs, and device drivers. ROM 1119 can be configured to provide computer instructions or data to processing circuitry 1101. For example, ROM 1119 can be configured to store invariant low-level system code or data for basic system functions such as basic input and output (I/O), startup, or reception of keystrokes from a keyboard that are stored in a non-volatile memory. Storage medium 1121 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1121 can be configured to include operating system 1123; application program 1125 such as a web browser application, a widget or gadget engine or another application; and data file 1127. Storage medium 1121 can store, for use by UE 1100, any of a variety of various operating systems or combinations of operating systems. For example, application program 1125 can include executable program instructions (also referred to as a computer program product) that, when executed by processor 1101, can configure UE 1100 to perform operations corresponding to various exemplary methods (e.g., procedures) described herein.

Storage medium 1121 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 can allow and/or facilitate UE 1100 to access computer-executable instructions, application programs or the like, stored on transitory or non-transitory memory media, to off-load data, or to upload data. An article of manufacture, such as one utilizing a communication system can be tangibly embodied in storage medium 1121, which can comprise a device readable medium.

In FIG. 11, processing circuitry 1101 can be configured to communicate with network 1143b using communication subsystem 1131. Network 1143a and network 1143b can be the same network or networks or different network or networks. Communication subsystem 1131 can be configured to include one or more transceivers used to communicate with network 1143b. For example, communication subsystem 1131 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1133 and/or receiver 1135 to implement transmitter or receiver functionality, respectively, appropriate to the RAN links (e.g., frequency allocations and the like). Further, transmitter 1133 and receiver 1135 of each transceiver can share circuit components, software or firmware, or alternatively can be implemented separately.

In the illustrated example, the communication functions of communication subsystem 1131 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 can include cellular communication, Wi-Fi communication, Bluetooth communication, and GPS communication. Network 1143b can encompass wired and/or wireless networks such as a local-area network (LAN), a wide-area network (WAN), a computer network, a wireless network, a telecommunications network, another like network or any combination thereof. For example, network 1143b can be a cellular network, a Wi-Fi network, and/or a near-field network. Power source 1113 can be configured to provide alternating current (AC) or direct current (DC) power to components of UE 1100.

The features, benefits and/or functions described herein can be implemented in one of the components of UE 1100 or partitioned across multiple components of UE 1100. Further, the features, benefits, and/or functions described herein can be implemented in any combination of hardware, software or firmware. In one example, communication subsystem 1131 can be configured to include any of the components described herein. Further, processing circuitry 1101 can be configured to communicate with any of such components over bus 1102. In another example, any of such components can be represented by program instructions stored in memory that when executed by processing circuitry 1101 perform the corresponding functions described herein. In another example, the functionality of any of such components can be partitioned between processing circuitry 1101 and communication subsystem 1131. In another example, the non-computationally intensive functions of any of such components can be implemented in software or firmware and the computationally intensive functions can be implemented in hardware.

Figure 12:
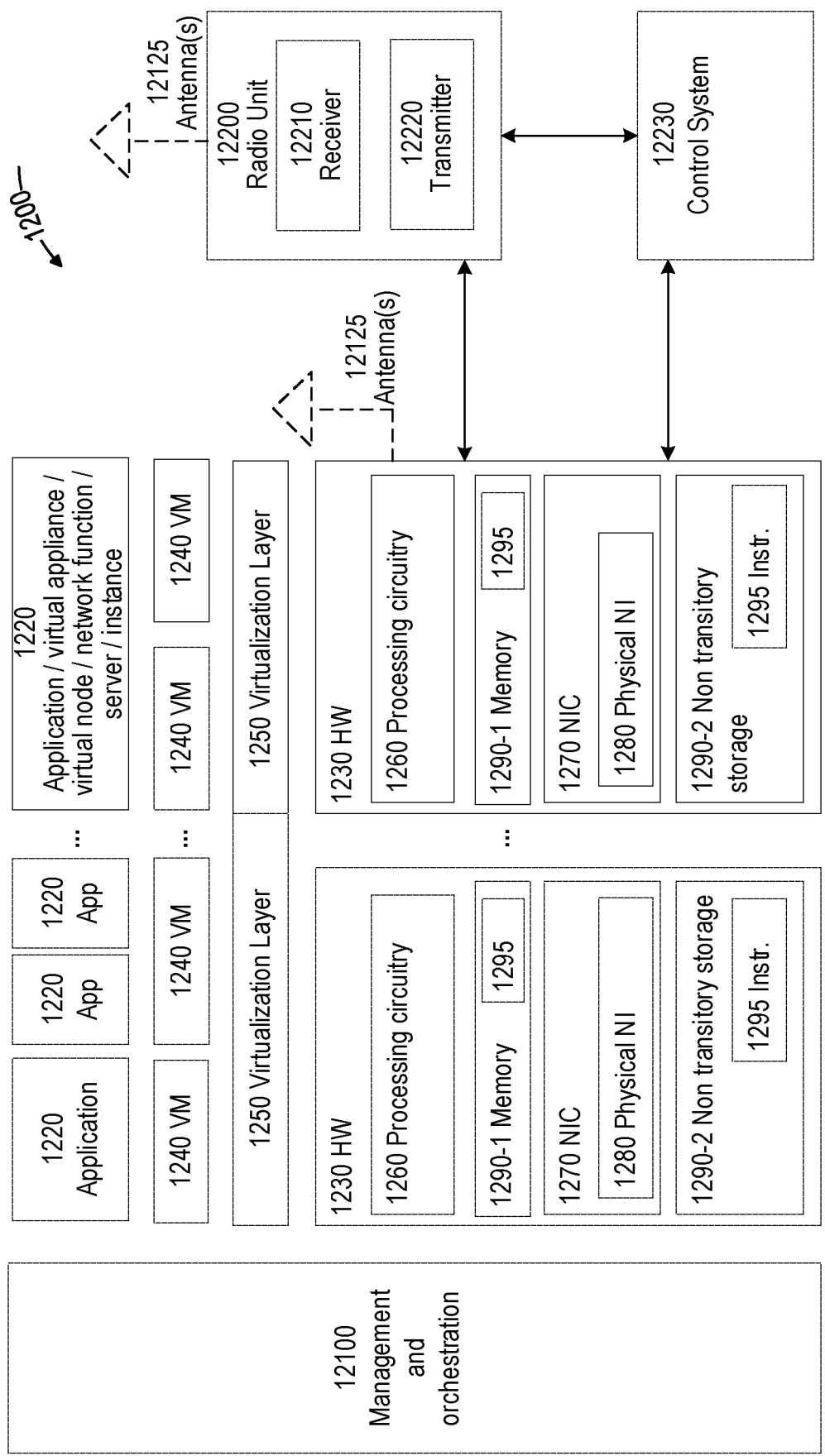
FIG. 12 is a block diagram illustrating an exemplary virtualization environment usable for implementation of various examples described herein.

FIG. 12 is a schematic block diagram illustrating a virtualization environment 1200 in which functions implemented by some examples can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some examples, some or all of the functions described herein can be implemented as virtual components executed by one or more virtual machines implemented in one or more virtual environments 1200 hosted by one or more of hardware nodes 1230. Further, in examples in which the virtual node is not a radio access node or does not require radio connectivity (e.g., a core network node), then the network node can be entirely virtualized.

The functions can be implemented by one or more applications 1220 (which can alternatively be called software instances, virtual appliances, network functions, application functions, virtual nodes, virtual network functions, etc.) operative to implement some of the features, functions, and/or benefits of some of the examples disclosed herein. Applications 1220 (including, e.g., network functions and/or application functions) are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200 can include general-purpose or special-purpose network hardware devices (or nodes) 1230 comprising a set of one or more processors or processing circuitry 1260, which can be commercial off-the-shelf (COTS) processors, dedicated Application Specific Integrated Circuits (ASICs), or any other type of processing circuitry including digital or analog hardware components or special purpose processors. Each hardware device can comprise memory 1290-1 which can be non-persistent memory for temporarily storing instructions 1295 or software executed by processing circuitry 1260. For example, instructions 1295 can include program instructions (also referred to as a computer program product) that, when executed by processing circuitry 1260, can configure hardware node 1220 to perform operations corresponding to various exemplary methods (e.g., procedures) described herein. Such operations can also be attributed to virtual node(s) 1220 that is/are hosted by hardware node 1230.

Each hardware device can comprise one or more network interface controllers (NICs) 1270, also known as network interface cards, which include physical network interface 1280. Each hardware device can also include non-transitory, persistent, machine-readable storage media 1290-2 having stored therein software 1295 and/or instructions executable by processing circuitry 1260. Software 1295 can include any type of software including software for instantiating one or more virtualization layers 1250 (also referred to as hypervisors), software to execute virtual machines 1240 as well as software allowing it to execute functions, features and/or benefits described in relation with some examples described herein.

Virtual machines 1240, comprise virtual processing, virtual memory, virtual networking or interface and virtual storage, and can be run by a corresponding virtualization layer 1250 or hypervisor. Different examples of the instance of virtual appliance 1220 can be implemented on one or more of virtual machines 1240, and the implementations can be made in different ways.

During operation, processing circuitry 1260 executes software 1295 to instantiate the hypervisor or virtualization layer 1250, which can sometimes be referred to as a virtual machine monitor (VMM). Virtualization layer 1250 can present a virtual operating platform that appears like networking hardware to virtual machine 1240.

As shown in FIG. 12, hardware 1230 can be a standalone network node with generic or specific components. Hardware 1230 can comprise antenna 12225 and can implement some functions via virtualization. Alternatively, hardware 1230 can be part of a larger cluster of hardware (e.g., such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1240 can be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some examples, one or more radio units 12200 that each include one or more transmitters 12220 and one or more receivers 12210 can be coupled to one or more antennas 12225. Radio units 12200 can communicate directly with hardware nodes 1230 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some examples, some signaling can be performed via control system 12230, which can alternatively be used for communication between the hardware nodes 1230 and radio units 12200.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary examples thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described examples will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary examples can be used together with one another, as well as interchangeably therewith, as should be understood by those having ordinary skill in the art.

The invention claimed is:

1. A method performed by an application function (AF) for a 5G communication network, the method comprising:
sending, to a Policy Control Function (PCF) for the 5G communication network, a subscription request for notifications about out-of-credit events and reallocation-of-credit events associated with one or more users of a service provided by the AF;
performing one or more first actions with respect to the service based on a first notification about an out-of-credit event associated with a first one of the first users of the service provided by the AF;
subsequently receiving, from the PCF, a second notification of a reallocation-of-credit event associated with the first user of the service provided by the AF; and
in response to the second notification, performing one or more second actions with respect to the service based on an indication, provided to the communication network, of whether the communication network should revert to one or more service requirements applicable before the out-of-credit event.

2. The method in accordance claim 1, wherein the one or more service requirements applicable before the out-of-credit event are included in the subscription request for notifications about out-of-credit events and reallocation-of-credit events.

3. The method of claim 1, wherein the indication of whether the communication network should revert to one or more service requirements applicable before the out-of-credit event is included in the subscription request for notifications about out-of-credit and reallocation-of-credit events.

4. The method of claim 1, wherein
the first notification includes an indication of one or more third actions to be performed by the communication network on data flows associated with the service, based on the out-of-credit event; and
the one or more first actions performed by the AF are based on the indicated one or more third actions to be performed by the communication network.

5. The method of claim 1, wherein the first actions include one or more of the following: terminating the service, terminating one or more data flows associated with the service, creating a further data flow for the service with downgraded quality of service (QoS), and dynamically adapting media codecs associated with the service.

6. The method of claim 1, wherein
the second notification includes an indication of one or more fourth actions to be performed by the communication network on data flows associated with the service, based on the reallocation-of-credit event; and
the one or more second actions performed by the AF are based on the indicated one or more fourth actions to be performed by the communication network.

7. The method of claim 1, wherein the second actions include one or more of the following: restoring a service quality of service (QoS) available before the out-of-credit event, terminating one or more data flows associated with the service, upgrading the QoS of an existing data flow, creating a further data flow for the service with upgraded QoS, and dynamically adapting media codecs associated with the service.

8. A method performed by a Policy Control Function (PCF) for a 5G communication network, the method comprising:
receiving, from an application function (AF) for the 5G communication network, a subscription request for notifications about out-of-credit events and reallocation-of-credit events associated with one or more users of a service provided by the AF;

detecting a reallocation-of-credit event associated with a first one of the users of the service provided by the AF, wherein:
  the reallocation-of-credit event is detected after a first notification to the AF about an out-of-credit event associated with the first user, in accordance with the subscription request; and
  the first notification is associated with one or more first actions by the AF with respect to the service; and
sending to the AF a second notification of the reallocation-of-credit event, wherein:
  the second notification is associated with one or more second actions by the AF with respect to the service; and
  the one or more second actions are based on an indication, from the AF, of whether the communication network should revert to one or more service requirements applicable before the out-of-credit event.

9. The method of claim 8, wherein the one or more service requirements applicable before the out-of-credit event are included in the subscription request for notifications about out-of-credit and reallocation-of-credit events.

10. The method of claim 9, wherein the indication of whether the communication network should revert to one or more service requirements applicable before the out-of-credit event is included in the subscription request for notifications about out-of-credit events and reallocation-of-credit events.

11. The method of claim 8, further comprising detecting the out-of-credit event based on receiving the following from a further NF in the communication network: a first request for policy control and charging (PCC) rules, and a first indication that the request is triggered by an out-of-credit event associated with the first user.

12. The method of claim 11, wherein:
the method further comprises determining one or more third actions to be performed, by the PCF, on data flows associated with the service based on the out-of-credit event; and
the first notification includes an indication of the third actions to be performed.

13. The method of claim 12, wherein the third actions include one or more of the following: terminating the service, redirecting the service to a refill portal, and restricting access to the service by allowing only certain data flows.

14. The method of claim 8, wherein detecting the reallocation-of-credit event comprises receiving the following from a further NF in the communication network: a second request for policy control and charging (PCC) rules, and a second indication that the request is triggered by a reallocation-of-credit event associated with the first user.

15. The method of claim 14, wherein:
the method further comprises determining one or more fourth actions to be performed by the PCF on data flows associated with the service based on the reallocation-of-credit event; and
the second notification includes an indication of the fourth actions to be performed.

16. The method of claim 15, wherein:
determining the fourth actions is based on the indication, from the AF, of whether the communication network should revert to one or more service requirements applicable before the out-of-credit event; and
the indication from the AF is included in the subscription request.

17. An application function (AF) for a 5G communication network, the AF comprising:
  communication interface circuitry configured to communicate with one or more policy control functions (PCFs) for the communication network and with user equipment (UEs); and
  processing circuitry operably coupled to the communication interface circuitry, whereby the processing circuitry and communication interface circuitry are configured to perform operations corresponding to the method of claim 1.

18. A non-transitory, computer-readable medium storing computer-executable instructions that, when executed by processing circuitry associated with an application function (AF) for a 5G communication network, configure the AF to perform operations corresponding to the method of claim 1.

19. A policy control function (PCF) for a 5G communication network, the PCF comprising:
  communication interface circuitry configured to communicate with an application function (AF) for the communication network; and
  processing circuitry operably coupled to the communication interface circuitry, whereby the processing circuitry and communication interface circuitry are configured to perform operations corresponding to the method of claim 8.

20. A non-transitory, computer-readable medium storing computer-executable instructions that, when executed by processing circuitry associated with a policy control function (PCF) for a 5G communication network, configure the PCF to perform operations corresponding to the method of claim 8.

* * * * *